US009710964B2

(12) United States Patent
Loper et al.

(10) Patent No.: US 9,710,964 B2
(45) Date of Patent: Jul. 18, 2017

(54) METHOD FOR PROVIDING A THREE DIMENSIONAL BODY MODEL

(71) Applicant: Max-Planck-Gesellschaft zur Foerderung der Wissenschaften e.V., Munich (DE)

(72) Inventors: Matthew Loper, Tuebingen (DE); Naureen Mahmood, Tuebingen (DE); Michael Black, Tuebingen (DE)

(73) Assignee: Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 0 days.

(21) Appl. No.: 14/602,701

(22) Filed: Jan. 22, 2015

(65) Prior Publication Data
US 2015/0206341 A1 Jul. 23, 2015

Related U.S. Application Data

(60) Provisional application No. 62/066,674, filed on Oct. 21, 2014, provisional application No. 61/930,711, filed on Jan. 23, 2014.

(51) Int. Cl.
| | | |
|---|---|---|
| *G06T 15/00* | (2011.01) | |
| *G06T 17/10* | (2006.01) | |
| *G06T 13/40* | (2011.01) | |
| *G06K 9/00* | (2006.01) | |
| *G01B 11/25* | (2006.01) | |

(52) U.S. Cl.
CPC ............ *G06T 17/10* (2013.01); *G01B 11/254* (2013.01); *G06K 9/00369* (2013.01); *G06T 13/40* (2013.01)

(58) Field of Classification Search
CPC ....... G06T 17/10; G06T 13/40; G01B 11/254; G06K 9/00369
USPC .................................................. 345/419, 420
See application file for complete search history.

(56) References Cited

U.S. PATENT DOCUMENTS

| 8,013,852 B2* | 9/2011 | Ng-Thow-Hing . G06K 9/00369 345/419 |
| 9,289,153 B2* | 3/2016 | Lang ...................... A61B 5/055 |
| 9,351,900 B2* | 5/2016 | Walsh .................... A61H 1/024 |

OTHER PUBLICATIONS

R. Boulic et al, Visualization of Local Movements for Optimal Marker Positioning, vol. 1899 of the series Lecture Notes in Computer Science pp. 133-144, 2000.*
Park et al,Data-driven Modeling of Skin and Muscle Deformation, ACM Trans Graph. 27, 3, Article 96 (Aug. 2008), pp. 1-6.*

(Continued)

*Primary Examiner* — Phu K Nguyen
(74) *Attorney, Agent, or Firm* — Caesar Rivise, PC

(57) ABSTRACT

A method for providing a three-dimensional body model which may be applied for an animation, based on a moving body, wherein the method comprises providing a parametric three-dimensional body model, which allows shape and pose variations; applying a standard set of body markers; optimizing the set of body markers by generating an additional set of body markers and applying the same for providing 3D coordinate marker signals for capturing shape and pose of the body and dynamics of soft tissue; and automatically providing an animation by processing the 3D coordinate marker signals in order to provide a personalized three-dimensional body model, based on estimated shape and an estimated pose of the body by means of predicted marker locations.

23 Claims, 21 Drawing Sheets

(56) References Cited

OTHER PUBLICATIONS

Allen et al. 2003. The space of human body shapes: Reconstruction and parameterization from range scans. ACM Trans. Graph. (Proc. SIGGRAPH) 22, 3, 587-594.

Anguelov et al. 2005. SCAPE: Shape Completion and Animation of People. ACM Trans. Graph. (Proc. SIG-GRAPH 24, 3, 408-416.

Bogo et al. 2014. FAUST: Dataset and evaluation for 3D mesh registration. In Proceedings IEEE Conf. on Computer Vision and Pattern Recognition (CVPR), 1-8.

De Aguiar et al. 2007. A simple framework for natural animation of digitized models. In Computer Graphics and Image Processing, 2007. SIBGRAPI 2007. XX Brazilian Symposium on, 3-10.

De Aguiar et al. 2007. Marker-less deformable mesh tracking for human shape and motion capture. In Proceedings IEEE Conf. on Computer Vision and Pattern Recognition (CVPR), 1-8.

De Aguiar et al. 2008. Performance capture from sparse multi-view video. ACM Trans. Graph. (Proc. SIGGRAPH) 27, Aug. 3, 98:1-98:10.

Hirshberg et al. 2012. Coregistration: Simultaneous alignment and modeling of articulated 3d shape. In Computer Vision ECCV 2012, A. Fitzgibbon, S. Lazebnik, P. Perona, Y. Sato, and C. Schmid, Eds., vol. 7577 of Lecture Notes in Computer Science. Springer Berlin Heidelberg, 242-255.

Hong et al. 2010. A data-driven segmentation for the shoulder complex. Computer Graphics Forum 29, 2, 537-544.

Jain et al. 2010. MovieReshape: Tracking and reshaping of humans in videos. ACM Transactions on Graphics (Proc. SIGGRAPH) 29, Dec. 6, 148:1-148:10.

Kwon et al. 2007. Rubber-like exaggeration for character animation. In Proceedings of the 15th Pacific Conference on Computer Graphics and Applications, IEEE Computer Society, Washington, DC, USA, PG '07, 18-26.

Leardini et al. 2005. Human movement analysis using stereophotogrammetry: Part 3. soft tissue artifact assessment and compensation. Gait & Posture 21, 2, 212-225.

Liu et al. 2013. Markerless motion capture of characters using multiview image segmentation. IEEE Transactions on Pattern Analysis and Machine Intelligence 35, 11, 2720-2735.

Neumann et al. 2013. Capture and statistical modeling of arm-muscle deformations. Computer Graphics Forum 32, May 2, 285-294.

Neumann et al. 2013. Sparse localized deformation components. ACM Trans. Graph. 32, Nov. 6, 179:1-179:10.

Park et al. 2006. Capturing and animating skin deformation in human motion. ACM Trans. Graph. (Proc. SIGGRAPH) 25, Jul. 3, 881-889.

Park et al. 2008. Data-driven modeling of skin and muscle deformation. ACM Trans. Graph. (Proc. SIGGRAPH) 27, Aug. 3, 96:1-96:6.

Sigal et al. 2012. Human attributes from 3D pose tracking. Computer Vision and Image Understanding 116, 5, 648-660.

Starck et al. 2007. Surface capture for performance-based animation. IEEE Computer Graphics and Applications 27, 3, 21-31.

Tsoli et al. 2014. Breathing life into shape: Capturing, modeling and animating 3D human breathing. ACM Trans. Graph., (Proc. SIG-GRAPH) 33, Jul. 4, 52:1-52:11.

Wadhwa et al. 2013. Phase-based video motion processing. ACM Trans. Graph., (Proc. SIGGRAPH) 32, Jul. 4, 80:1-80:10.

Wang et al. 2007. Videoshop: A new framework for spatio-temporal video editing in gradient domain. Graph. Models 69, 1, 57-70.

Wu et al. 2012. Eulerian video magnification for revealing subtle changes in the world. ACM Trans. Graph. (Proc. SIGGRAPH) 31, Jul. 4, 65:1-65:8.

\* cited by examiner

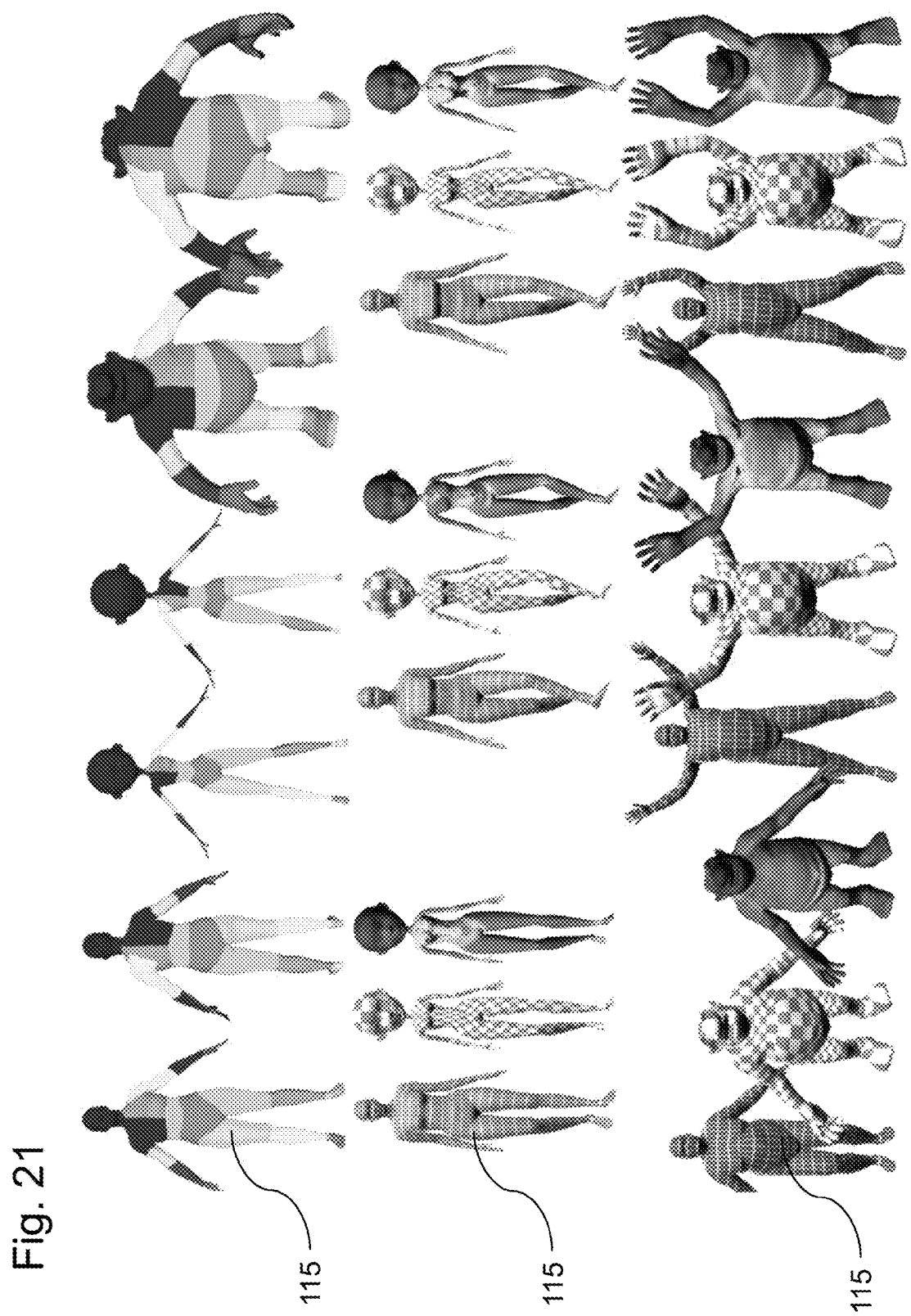

METHOD FOR PROVIDING A THREE DIMENSIONAL BODY MODEL

This application claims priority to U.S. 61/930,711 and U.S. 62/066,674 which are both incorporated by reference in their entirety.

The present invention relates to a method for providing a three-dimensional body model and an apparatus for providing a three-dimensional body model by Motion and Shape capture MoSh.

BACKGROUND OF THE INVENTION

There is an extensive literature on (and commercial solutions for) estimating skeleton proxies from marker sets. Since MoSh does not use a skeleton, these methods are not reviewed here. Instead, it is focused on several key themes in the literature that more directly relate to the work: fitting models to sparse markers, dense marker sets, and surface capture.

From Markers to Models: To get body shape from sparse markers, one needs a model of body shape to constrain the problem. There have been several previous approaches.

ALLEN, B., CURLESS, B., AND POPOVIC, Z. 2003. The space of human body shapes: Reconstruction and parameterization from range scans. ACM Trans. Graph. (Proc. SIGGRAPH) 22, 3, 587-594, learn a model of body shape variation in a fixed pose from 3D training scans.

ANGUELOV, D., SRINIVASAN, P., KOLLER, D., THRUN, S., RODGERS, J., AND DAVIS, J. 2005. SCAPE: Shape Completion and Animation of People. ACM Trans. Graph. (Proc. SIG-GRAPH 24, 3, 408-416 go further to learn a model that captures both body shape and non-rigid pose deformation.

Allen et al. show that one can approximately recover an unknown 3D human shape from a sparse set of 74 landmarks. They do this only for a fixed pose since their model does not represent pose variation. Importantly the landmarks are perfect and known; that is, they have the 3D points on the mesh they want to recover and do not need to estimate their location on the mesh. Unlike MoSh this does not address the problem of estimating body shape and pose from mocap markers alone.

Anguelov et al. [2005] show how to animate a SCAPE model from motion capture markers. Their method requires a 3D scan of the subject with the markers on their body. This scan is used for two purposes. First it is used to estimate the 3D shape model of the person; this shape is then held fixed. Second the scanned markers are used to establish correspondence between the scan and the mocap markers. These limitations mean that the approach cannot work on archival mocap data and that a user needs both a 3D body scanner and a mocap system.

It is important to note that Anguelov et al. did not solve the problem addressed by MoSh. They fit a SCAPE model to a 3D body scan (what they call shape completion) and with known marker locations, animate the model from mocap markers. It is gone go beyond their work to estimate the body shape from only the sparse mocap markers without the use of any scan and without knowing their precise location on the body. This is done by simultaneously solving for the marker locations, the shape of the body and the pose using a single objective function and optimization method. Unlike [Anguelov et al. 2005], MoSh is fully automatic and applicable to archival data.

It is gone also beyond previous work to define new marker sets and evaluate the effect of these on reconstruction accuracy. This provides a guide for practitioners to choose appropriate marker sets.

Dynamics of Soft Tissue: Unlike MoSh, the above work does not address the capture of soft tissue motion. Interestingly, much of the attention paid to soft-tissue motion in the mocap community (particularly within biomechanics) actually focuses on minimizing the effects of soft tissue dynamics, as disclosed in LEARDINI, A., CHIARI, L., CROCE, U. D., AND CAPPOZZO, A. 2005. Human movement analysis using stereophotogrammetry: Part 3. soft tissue artifact assessment and compensation. Gait & Posture 21, 2, 212-225. Soft tissue motion means the markers move relative to the bones and this reduces the accuracy of the estimated skeletal models. For animation, it is argued that such soft tissue motions are actually critical to making a character look alive.

Dense Marker Sets: To capture soft-tissue motion, previous work has used large, dense, marker sets. PARK, S. I., AND HODGINS, J. K. 2006. Capturing and animating skin deformation in human motion. ACM Trans. Graph. (Proc. SIGGRAPH) 25, 3 (July), 881-889, use 350 markers to recover skin deformation; in the process, they deform a subject-specific model to the markers and estimate missing marker locations. In PARK, S. I., AND HODGINS, J. K. 2008. Data-driven modeling of skin and muscle deformation. ACM Trans. Graph. (Proc. SIGGRAPH) 27, 3 (August), 96:1-96:6, they use a large (400-450) marker set for ≈10,000 frames of activity to create a subject-specific model; this model can then be used to recover pose for the same subject in later sessions with a sparse marker set. In these works, the authors visualize soft-tissue deformations on characters resembling the mocap actor. Here soft-tissue deformations are transferred to more stylized characters.

HONG, Q. Y., PARK, S. I., AND HODGINS, J. K. 2010. A data-driven segmentation for the shoulder complex. Computer Graphics Forum 29, 2, 537-544, use 200 markers on the shoulder complex and a data driven approach to infer a model of shoulder articulation. While dense markers can capture rich shape and deformation information, they are not practical for many applications. Placing the markers is time consuming and a large number of markers may limit movement. With these large sets, additional challenges emerge in dealing with inevitable occlusions and marker identification.

Recent work captures skin deformations using a dense set of markers or patterns painted on the body, like BOGO, F., ROMERO, J., LOPER, M., AND BLACK, M. J. 2014. FAUST: Dataset and evaluation for 3D mesh registration. In Proceedings IEEE Conf. on Computer Vision and Pattern Recognition (CVPR) or NEUMANN, T., VARANASI, K., HASLER, N., WACKER, M., MAGNOR, M., AND THEOBALT, C. 2013. Capture and statistical modeling of arm-muscle deformations. Computer Graphics Forum 32, 2 (May), 285-294. The work is similar to Park and Hodgins but uses computer vision methods rather than standard mocap markers.

The present invention differs in that it conforms to standard mocap practice and is backwards-compatible with existing sparse marker sets. The goal of MoSh is to get more out of sparse markers.

Surface Capture: At the other extreme from sparse markers are methods that capture full 3D meshes at every time instant, like DE AGUIAR, E., STOLL, C., THEOBALT, C., AHMED, N., SEIDEL, H.-P., AND THRUN, S. 2008. Performance capture from sparse multi-view video. ACM Trans. Graph. (Proc. SIGGRAPH) 27, 3 (August), 98:1-98:

10 or STARK, J., AND HILTON, A. 2007. Surface capture for performance-based animation. IEEE Computer Graphics and Applications 27, 3, 21-31; this can be conceived of as a very dense marker set. Still other methods use a scan of the person and then deform it throughout a sequence, like DE AGUIAR, E., THEOBALT, C., STOLL, C., AND SEIDEL, H.-P. 2007. Marker-less deformable mesh tracking for human shape and motion capture. In Proceedings IEEE Conf. on Computer Vision and Pattern Recognition (CVPR), 1-8 or LIU, Y., GALL, J., STOLL, C., DAI, Q., SEIDEL, H.-P., AND THEOBALT, C. 2013. Markerless motion capture of multiple characters using multiview image segmentation. IEEE Transactions on Pattern Analysis and Machine Intelligence 35, 11, 2720-2735.

Existing methods for surface capture rely on multi-camera computer vision algorithms that are computationally expensive compared with commercial marker-based systems. These methods are most applicable to capturing complex surfaces like clothing or breathing that are difficult to parametrize, like TSOLI, A., MAHMOOD, N., AND BLACK, M. J. 2014. Breathing life into shape: Capturing, modeling and animating 3D human breathing. ACM Trans. Graph., (Proc. SIGGRAPH) 33, 4 (July), 52:1-52:11. In the case of body shape, it is found that, together with a parametric body model, a small marker set is already very powerful.

DE AGUIAR, E., ZAYER, R., THEOBALT, C., SEIDEL, H. P., AND MAGNOR, M. 2007. A simple framework for natural animation of digitized models. In Computer Graphics and Image Processing, 2007. SIBGRAPI 2007. XX Brazilian Symposium on, 3-10, in a related approach use an intermediate template that is animated in a traditional way from mocap markers. They then transfer the template motion to a more complex mesh. Like MoSh this method is motivated by standard practice but it still indirects through a crude proxy, rather than solving directly for shape and pose from markers.

Attribute Capture: The idea that markers contain information about body shape is not new. LIVNE, M., SIGAL, L., TROJE, N., AND FLEET, D. 2012. Human attributes from 3D pose tracking. Computer Vision and Image Understanding 116, 5, 648-660, use motion capture data to extract socially meaningful attributes, such as gender, age, mental state and personality traits by applying 3D pose tracking to human motion. This work shows that a sparse marker set contains rich information about people and their bodies. MoSh takes a different approach by using the sparse marker data to extract faithful 3D body shape. Like Livne et al., it is shown that gender can be estimated from markers. Beyond this, it is suspected that the full 3D body model can be used to extract additional attributes.

Motion Magnification. There has been recent work on magnifying small motions in video sequences, like WANG, H., XU, N., RASKAR, R., AND AHUJA, N. 2007. Videoshop: A new framework for spatio-temporal video editing in gradient domain. Graph. Models 69, 1, 57-70; WU, H.-Y., RUBINSTEIN, M., SHIH, E., GUTTAG, J., DURAND, F., AND FREEMAN, W. T. 2012. Eulerian video magnification for revealing subtle changes in the world. ACM Trans. Graph. (Proc. SIGGRAPH) 31, 4 (July), 65:1-65:8; or WADHWA, N., RUBINSTEIN, M., DURAND, F., AND FREEMAN, W. T. 2013. Phase-based video motion processing. ACM Trans. Graph., (Proc. SIGGRAPH) 32, 4 (July), 80:1-80:10; but less work on magnifying 3D motions.

In part this may be because capturing 3D surface motions is difficult. Other work exaggerates mocap skeletal motions using mocap data, like KWON, J.-Y., AND LEE, I.-K. 2007. Rubber-like exaggeration for character animation. In Proceedings of the 15th Pacific Conference on Computer Graphics and Applications, IEEE Computer Society, Washington, D.C., USA, PG '07, 18-26.

NEUMANN, T., VARANASI, K., WENGER, S., WACKER, M., MAGNOR, M., AND THEOBALT, C. 2013. Sparse localized deformation components. ACM Trans. Graph. 32, 6 (November), 179:1-179:10 develop methods for spatially localized modeling of deformations and show that these deformations can be edited and exaggerated.

JAIN, A., THORMAHLEN, T., SEIDEL, H.-P., AND THEOBALT, C. 2010. MovieReshape: Tracking and reshaping of humans in videos. ACM Transactions on Graphics (Proc. SIGGRAPH) 29, 6 (December), 148:1-148:10 edit body shape to exaggerate it but do not model or amplify non-rigid soft-tissue dynamics. While the exaggeration of facial motion has received some attention, this is the first work to use only sparse marker sets to extract full-body soft tissue motion for exaggeration.

In summary, MoSh occupies a unique position—it estimates 3D body shape and deformation using existing mocap marker sets. MoSh produces animated bodies directly from mocap markers with a realism that would be time consuming to achieve with standard rigging and skeleton-based methods.

SUMMARY OF THE INVENTION

It is an object of the present invention to estimate body shape and pose together using marker data by exploiting a parametric model of the human body.

According to a first aspect this object is solved by a method for providing a three-dimensional body model which may be applied for an animation, based on a moving body, wherein the method comprises providing a parametric three-dimensional body model, which allows shape and pose variations; applying a set of body markers; optimizing the set of body markers by generating an additional set of body markers and applying the same for providing 3D coordinate marker signals for capturing shape and pose of the body and dynamics of soft tissue; and automatically providing an animation by processing the 3D coordinate marker signals in order to provide a personalized three-dimensional body model, based on estimated shape and an estimated pose of the body by means of predicted marker locations. The set of body markers can be a standard set of body markers. The set of body markers can be applied to the three-dimensional body model.

In a preferred embodiment of the method the three-dimensional body model is trained by means of a set of scans in a plurality of shapes and poses in order to represent shape and pose-dependent deformations. The training can be executed separately for men and women.

In a further preferred embodiment of the method the marker set is sparse.

In a further preferred embodiment of the method a handful of markers are arranged on any body part.

In a further preferred embodiment of the method the number of body markers is below or equal to 47 or 67.

In a further preferred embodiment of the method the pose of the body is assumed to vary smoothly over time.

In a further preferred embodiment of the method the body shape of the subject does not change over time.

In a further preferred embodiment of the method the body shape of the subject changes over time.

In a further preferred embodiment of the method the changing body shape is constrained to be close to a fixed body shape representing a person's identity.

In a further preferred embodiment of the method the method is applied for providing an animation of a character without converting motion capture data to a rigged model of the character.

In a further preferred embodiment of the method the three-dimensional body model is directly used for an animation of a character.

In a further preferred embodiment of the method the three-dimensional body model is used as reference for retargeting the data to other animated characters.

In a further preferred embodiment of the method the three-dimensional body model considers dynamics of complex surface deformation, in particular of soft tissue, like fat and muscle.

In a further preferred embodiment of the method the dynamics of complex surface deformation is transferred to a further three-dimensional body model.

In a further preferred embodiment of the method the dynamics of complex surface deformation is exaggerated or attenuated, when transferring it to the further three-dimensional body model.

In a further preferred embodiment of the method the method may be executed on archival motion capture sequences.

In a further preferred embodiment of the method the additional set of body markers is positioned on soft tissue.

In a further preferred embodiment of the method the additional set of body markers is selected from a generated superset of additional maker sets.

In a further preferred embodiment of the method the additional set of body markers is selected to optimize a given objective function.

In a further preferred embodiment of the method a greedy search method is used for selecting the additional set of body markers.

In a further preferred embodiment of the method the method is used in a motion capture system.

In a further preferred embodiment of the method the body is a human or animal body.

According to a second aspect this object is solved by an apparatus for providing a three-dimensional body model which may be applied for an animation, based on a moving body, comprising a model storage which is adapted for providing a parametric three-dimensional body model, which allows shape and pose variations; a position detector which is adapted for applying a set of body markers; an optimizer, which is adapted for optimizing the set of body markers by generating an additional set of body markers and applying the same for providing 3D coordinate marker signals for capturing shape and pose of the body and dynamics of soft tissue; and a processor for automatically processing the 3D coordinate marker signals in order to provide a personalized three-dimensional body model, based on estimated shape and an estimated pose of the body by means of predicted marker locations. The set of body markers can be a standard set of body markers. The set of body markers can be applied to the three-dimensional body model.

According to a second aspect this object is solved by a non-transitory computer readable medium containing computer-readable instructions stored therein for causing a computer processor to perform the steps of the method according to the first aspect.

BRIEF DESCRIPTION OF THE DRAWINGS

FIG. 21 shows retargeting soft-tissue motions.

DESCRIPTION OF THE INVENTION

Figure 1:
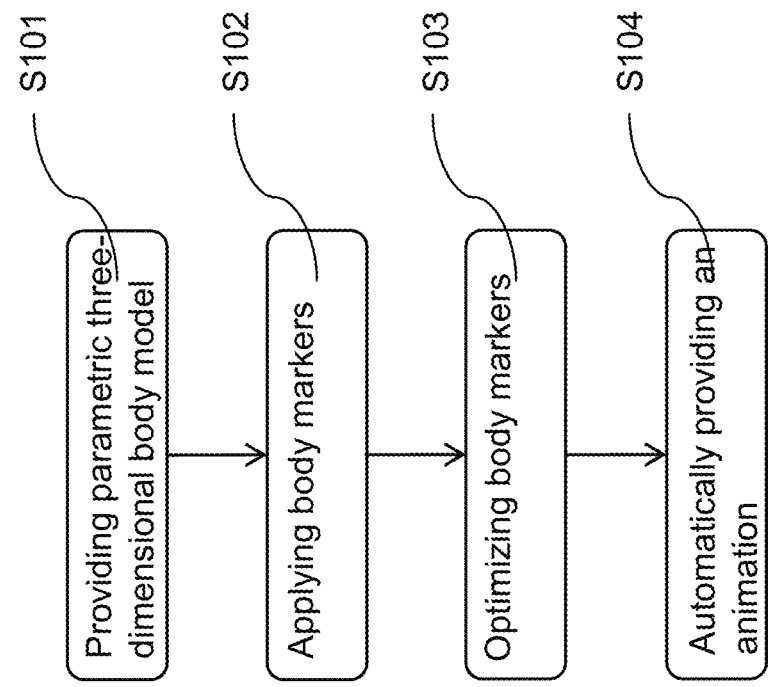
FIG. 1 shows a block diagram of a method for providing a three-dimensional body model.

FIG. 1 shows a block diagram of a method for providing a three-dimensional body model, which may be applied for an animation, based on a moving body. Motion and Shape are captured from sparse markers, a method denoted as MoSh (Motion and Shape capture).

The method comprises the step S101 of providing a parametric three-dimensional body model, which allows shape and pose variations; the step S102 of applying a standard set of body markers; the step S103 of optimizing the set of body markers by generating an additional set of body markers and applying the same for providing 3D coordinate marker signals for capturing shape and pose of the body and dynamics of soft tissue; and the step S104 of automatically providing an animation by processing the 3D coordinate marker signals in order to provide a personalized three-dimensional body model, based on estimated shape and an estimated pose of the body by means of predicted marker locations.

Figure 2:
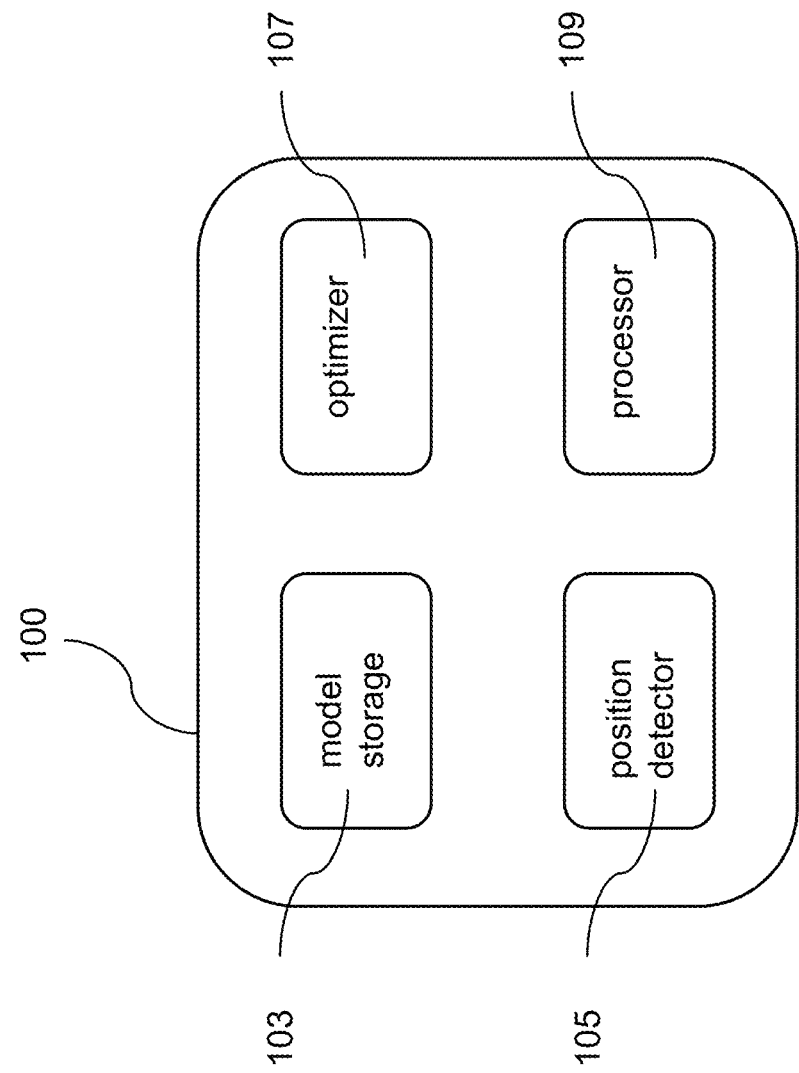
FIG. 2 shows a schematic view of an apparatus for providing a three-dimensional body model.

FIG. 2 shows a schematic view of an apparatus 100 for providing a three-dimensional body model which may be applied for an animation, based on a moving body. The apparatus 100 comprises a model storage 103 which is adapted for providing a parametric three-dimensional body model, which allows shape and pose variations; a position detector 105 which is adapted for applying a standard set of body markers; an optimizer 107, which is adapted for optimizing the set of body markers by generating an additional set of body markers and applying the same for providing 3D coordinate marker signals for capturing shape and pose of the body and dynamics of soft tissue; and a processor 109 for automatically processing the 3D coordinate marker signals in order to provide a personalized three-dimensional body model, based on estimated shape and an estimated pose of the body by means of predicted marker locations. The method and the features can be implemented by means of a computer having a storage and processor.

Motion Shape Capture from Sparse Markers I

Figure 3:
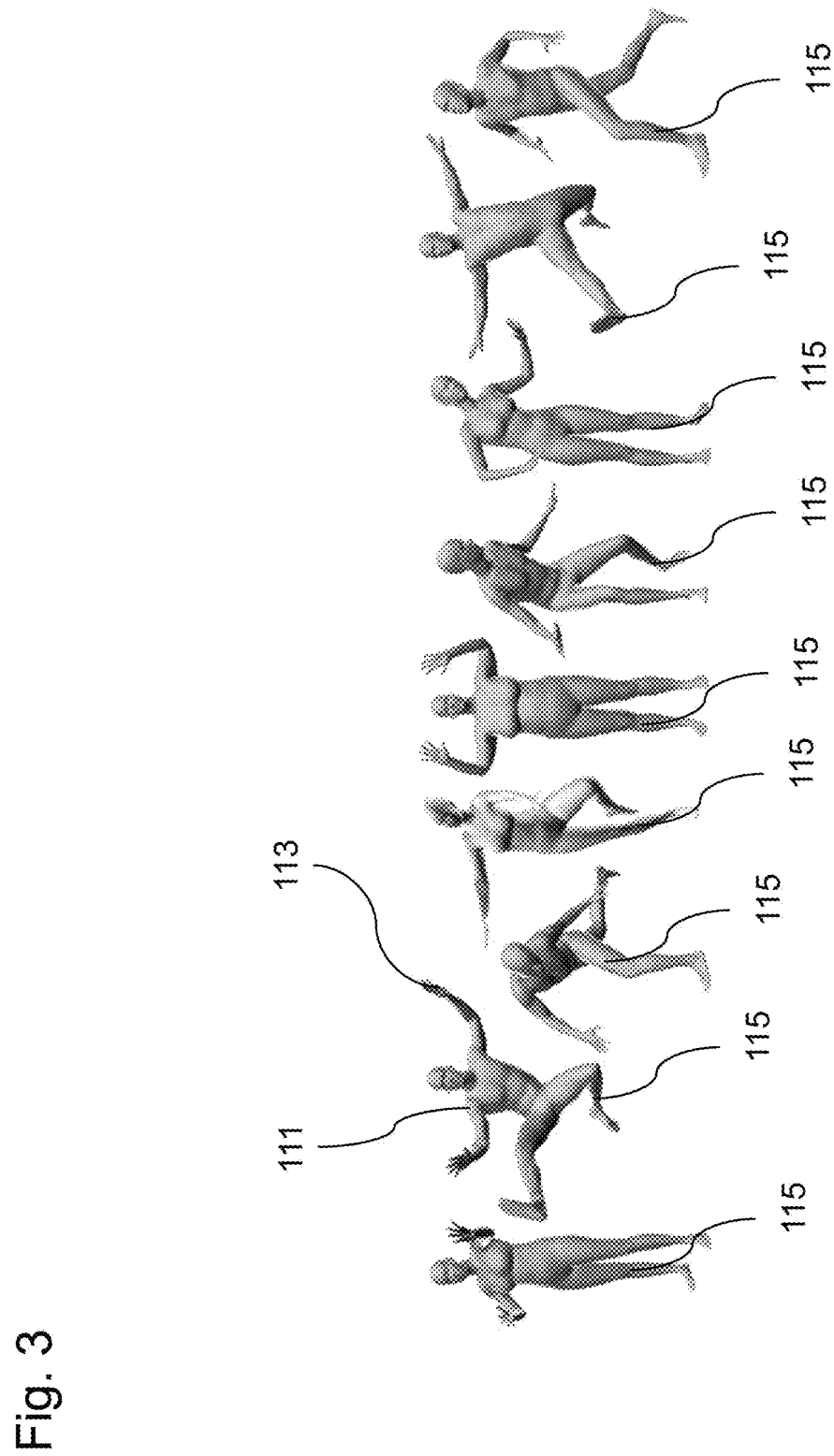
FIG. 3 shows estimated example body shapes and poses.

FIG. 3 shows Carnegie Mellon University CMU subjects. Example body shapes 111 and poses 113 of a body 115 are estimated from the CMU motion capture dataset using the standard 42 Vicon markers. MoSh automatically takes mocap marker data and produces animations with a level of lifelike realism that is difficult to achieve with standard skeleton-based mocap methods.

While marker-based motion capture (mocap) is widely used to animate human characters in films and games, it is also widely criticized as producing lifeless and unnatural motions. This is the result of "indirecting" through a skeleton that acts as a proxy for the human movement. In standard mocap, visible 3D markers on the body surface are used to infer the unobserved skeleton. This skeleton is then used to animate a 3D model and what is rendered is the visible body surface. Subtle information about motion of the body 115 is lost in the process of going from the non-rigid body surface to the rigid, articulated, skeleton representation. MoSh replaces the skeleton with a 3D parametric body model. Given a standard marker set, MoSh simultaneously estimates the marker locations on the proxy body, estimates the body shape 111, and recovers the pose 113. By allowing body shape 111 to vary over time, MoSh is also able to capture the non-rigid motion of soft tissue. This process is fully automatic and results in nuanced and lifelike animations. Since no body scanner or other hardware is required, MoSh can be applied to archival mocap data like that in FIG. 5.

The basic version of MoSh has five core components. 1) MoSh uses a parametric 3D body model that realistically represents a wide range of natural body shapes 111, poses 113, pose-dependent deformations, and other non-rigid shape deformations. For this a learned statistical body model based on SCAPE is used. 2) Marker placement on the body 115 is done inexactly by hand, and varies from session to session; exact marker placement is not assumed. Consequently, a key contribution of MoSh is that it solves for marker locations relative to the 3D body. 3) MoSh also simultaneously solves for the 3D body shape 111 of the person that best explains the observed 3D mocap marker data. 4) Steps 2 and 3 above require that also simultaneously it is solved for 3D body pose 113. Components 2-3 are all embodied in a single objective function and this is optimized for a subset of the mocap sequence. 5) In a second stage, MoSh uses the computed body shape 111 and marker locations on the body 115, to estimate body pose 113 throughout a mocap session.

This basic method produces realistic animations but the assumption of a single body shape 111 across the session does not account for the dynamics of soft tissue; for example, the jiggling of fat during jumping. Currently there are no practical technologies for easily capturing these soft-tissue motions and most mocap methods treat them as noise that corrupts the skeletal motion. A novel solution is developed that solves for a changing body shape 111 across the sequence by penalizing deviations from the shape 111 estimated without dynamics. The result is surprisingly realistic soft-tissue motion from traditional marker sets or new sets containing just a few more markers on areas of soft tissue. A range of marker sets is evaluated and it is found that the standard 42-marker set often used for motion capture (e.g. in the CMU dataset) works surprisingly well for recovering both shape 111 and pose 113. It is shown that larger marker sets produce more realism but with diminishing returns. The output of MoSh is a 3D body model that best fits the marker data and the accuracy of this estimated body shape 111 is evaluated. On the CMU dataset, a range of body shapes 111 is found that visually resemble reference video. For quantitative evaluation, four subjects with widely different body shapes 111 and performed MoSh with different numbers of makers are scanned. MoSh can be used directly for animation or as a reference for animators. It is also shown that the body shape 111 can be changed to retarget the mocap sequence to new bodies.

This allows a professional dancer, for example, to perform an action and then another actor with a different body shape 111 can be realistically animated without the labor-intensive process of transferring skeletal motion to a rigged model. As described in the next section, MoSh goes significantly beyond previous work. The main contribution of MoSh is that it provides a fully automated method for "mining" lifelike body shape 111 and pose information from sparse marker sets. This makes MoSh appropriate for processing archival mocap and also makes it completely compatible with existing marker-based mocap technology. MoSh is seen as complimenting rather than replacing existing methods. Because MoSh can use standard marker sets, nothing is lost relative to existing approaches. Rather, the realism and ease of use extends the usefulness of existing mocap systems and datasets and breathes new life into motion capture.

The work requires a good low-dimensional model of the human body to reduce ambiguities; here a BlendSCAPE body model is used, which is similar to the SCAPE model. The BlendSCAPE model is described in HIRSHBERG, D., LOPER, M., RACHLIN, E., AND BLACK, M. 2012. Coregistration: Simultaneous alignment and modeling of articulated 3d shape. In Computer Vision ECCV 2012, A. Fitzgibbon, S. Lazebnik, P. Perona, Y. Sato, and C. Schmid, Eds., vol. 7577 of Lecture Notes in Computer Science. Springer Berlin Heidelberg, 242-255. The SCAPE model is described in ANGUELOV, D., SRINIVASAN, P., KOLLER, D., THRUN, S., RODGERS, J., AND DAVIS, J. 2005. SCAPE: Shape Completion and Animation of People. ACM Transactions on Graphics 24, 3, 408-416.

But any differentiable mesh-producing model could be used, as long as (1) it allows shape and pose variation, and (2) is differentiable with respect to its parameters. The BlendSCAPE model produces a triangulated mesh, and is parameterized by a global translation center $\gamma$, a vector of pose parameters $\theta$, and a vector of shape parameters $\beta$. The surface of the body is described as $S(\gamma,\theta,\beta)$ with the coordinates of vertex k notated $S_k(\gamma,\theta,\beta)$.

The pose parameters $\theta$ consist of 19 angle-axis vectors, whereby length indicates the amount of rotation. Body shape 111 is approximated in by a linear combination of shape basis vectors; $\gamma$ is a vector of these linear coefficients. This shape basis is learned from deformations of training body shapes 111 using principal component analysis. In what follows, body shape 111 is represented using between 80 and 200 principal components depending on whether or not soft tissue motions are computed. A multi-resolution version of the model is trained such that the parameters of the model are consistent across scale. For efficiency a low-resolution model with 5389 vertices is used to optimize the marker locations, shape 111, and pose 113. For display a version with 43102 vertices is rendered. The body shape model is trained from 3803 CAESAR scans of people in an upright pose 113 (approximately 2103 women and 1700 men from the US and EU datasets). The posedependent component of the model is learned from 1832 scans of 78 people (41 women and 37 men) in a wide range of poses 113. The scans are aligned. Since the model is trained from an extensive set of scans, it is able to realistically capture a wide range shapes and poses 113. Separate models for men and women are trained. For MoSh, it is assumed that the gender is known but one could extract this automatically by fitting both models and selecting the one with lowest error.

Figure 4:
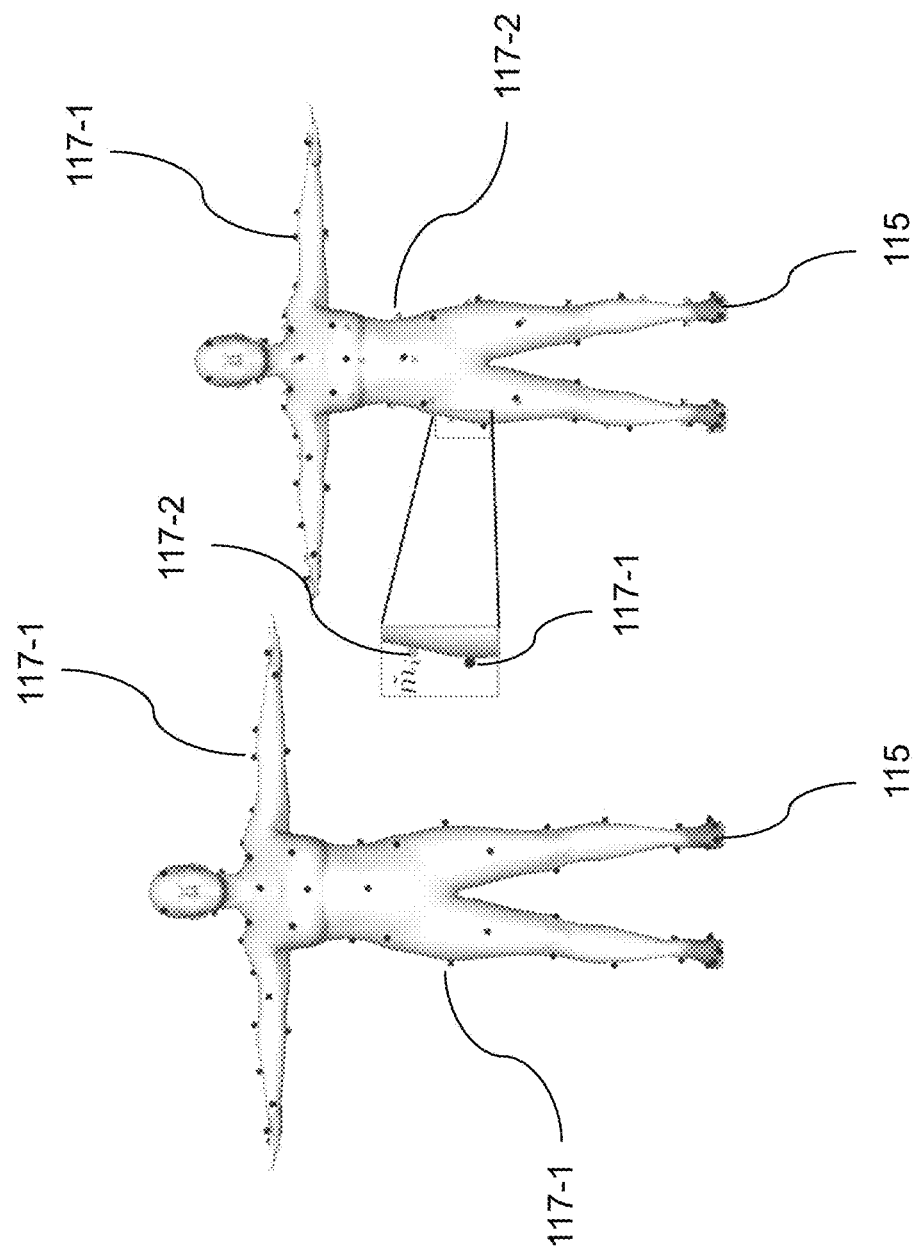
FIG. 4 shows optimizing shape and markers.

FIG. 4 shows optimizing shape 111 and markers 117-1. Left an initial guess of markers 117-1 on the template shape 111 in the canonical pose 113 is shown as dark balls. Right shape and marker locations of markers 117-2 after optimization during Stage 1 are shown. Optimized marker locations of markers 117-2 are shown as light balls. Note that they have moved. The inset shows the notation used in the text for the optimized marker 117-2.

Mocap markers 117 extend from the body 115 to varying degrees and are placed on the body 115 manually. Precise placement can be difficult, particularly on heavy subjects where fat makes it difficult to palpate boney locations. The result is that it cannot be expected to know the exact marker locations in advance.

In defining a marker set the only manual part of MoSh occurs if a user wants to use a new marker set. In this case they need to identify a template vertex for each marker 117, and a distance from the surface for each marker 117. Both can be approximate. This only needs to be done once and then it is used for any subject captured with that marker set. For example, this is done once for the 42-marker Vicon set and used this for all mocap sequences in the CMU database.

To parameterize marker locations with respect to the body 115, a latent frame of reference is introduced which contains markers 117 and the body model in a neutral pose, $\gamma_0$, $\theta_0$, as in FIG. 4 (left). The purpose of this latent frame is to establish the relationship between the body surface and the markers in a pose-independent, translation independent, and non-redundant fashion. Markers position in the latent space is optimized simultaneously with all other independent variables, e.g. shape 111 and pose 113. Marker locations in the latent frame are denoted as $\tilde{m}_i \in \mathbb{R}^3$, where i denotes the landmark index. The collection of these state variables is denoted as $\tilde{M}$. Transformed marker locations in observed frames are denoted as $\hat{m}_{i,t} \in \mathbb{R}^3$, where t indicates frame in the mocap sequence.

To transform an estimated maker $\tilde{m}_i$ from the latent frame to $\hat{m}_{i,t}$, in captured frame t, a relationship between each $\tilde{m}_i$ to nearby geometry in the latent frame is estimated, and then that relationship is applies in captured frames. Each $\tilde{m}_i$ can be considered with respect to its nearest vertex in the latent frame, whose index is $$\hat{k}_i = \arg\min_k \|\tilde{m}_i - S_k(\gamma_0, \theta_0, \beta)\|^2. \quad (1)$$

More specifically, $\tilde{m}_i$ can be represented in a local basis formed from its nearest vertex, the edges leaving that vertex and the normal at the vertex.

To make this concrete, the function is defined:

$$q(\gamma, \theta, \beta, k, w) = \quad (2)$$
$$S_k(\gamma, \theta, \beta) + w_0 g(S_k(\gamma, \theta, \beta)) + \sum_{n \in N(k)} w_n(S_n(\gamma, \theta, \beta) - S_k(\gamma, \theta, \beta))$$

where $g(\cdot)$ is a function that returns the normal of the surface, $N(k)$ indicates neighbors of the vertex k, and the $w_i$ are scalar weights that are collected into a vector w.

Then it is solved for the $\hat{w}_i$ that minimizes $$\hat{w}_i = \arg\min_{w_i} \|q(\gamma_0, \theta_0, \beta, \hat{k}_i, w_i) - \tilde{m}_i\|^2 + \|w_i\| \quad (3)$$

where the norm, $\|\hat{w}_i\|$, of w is minimized to constrain the solution.

With these weights, $\tilde{m}_i$ is defined as a combination of vertices and the normal on the model. Let $\hat{q}(\gamma,\theta,\beta)=q(\gamma_t,\theta_t,\beta,\hat{k}_i,\hat{w}_i)$. With this the marker location in a captured frame can be computed as $$\hat{m}_{i,t}=\hat{q}(\gamma_t,\theta_t,\beta), \quad (4)$$

Notably, the transformation from latent to observed frames is continuously re-estimated over the course of optimization. The values of $\hat{k}$ and $w_i$ define the marker 117 on the body 115 in the reference frame and they change during the optimization to reposition the markers, shown in FIG. 4 right. Note also that these parameters do not vary with t; they are fixed for the entire sequence. Having defined the transformation of markers 117 from latent to observed frames, now functions are introduced that help regularize markers 117 to the mesh. In the optimization method that follows it is important that the $\tilde{m}_i$ are not free to move anywhere. They are constrained by the initial markers defined above (FIG. 4 left).

First, let $r(x,S)$ denote a function that returns the signed distance of x to surface S. Each marker 117 requires the user-specification of an expected distance $d_i$ from the marker center to the skin surface. This is the a priori distance that the marker 117 is expected to be from the surface. Second, functions are introduced to relate markers 117 to user-indicated vertices on the mesh. Notationally, it is said a user creates a mapping $h(i)$ from marker indices to vertex indices on the template. Further the position of these vertices is denoted as $$\hat{v}_i(\beta) \equiv S_{h(k)}(\gamma_0, \theta_0, \beta), \quad (5)$$

meaning that $\hat{v}_i(\beta)$ is the position of the model vertex in the latent frame corresponding to marker $\tilde{m}_i$. These are used to initialize $\tilde{m}_i$, and also as a weak prior, as will be seen below.

The goal is to estimate a faithful personalized body 115 from sparse marker locations $m_{i,t} \in \mathbb{R}^3$, where t and i denote time step and landmark index respectively, which explains observed marker evidence. The pose 113 of the body, $\theta_t \in \Theta$ and the position, $\gamma_t \in \Gamma$ vary with time. For now, it is assumed that body shape 111, is fixed for an individual and represents the shape 111 with the first 80 principal components; these account for approximately 75% of the variance present in the training scans of men and women.

It is wished to estimate the markers 117, pose 113 and shape 111 of the body 115 such that the transformed markers 117 match the observed markers 117. This is as a MAP estimation problem considered, with the joint probability factored into likelihood and prior:

$$p(M,\tilde{M},\Gamma,\Theta,\beta)=p(M|\tilde{M},\Gamma,\Theta,\beta)p(\tilde{M},\Gamma,\Theta,\beta) \quad (6)$$

where M represents the set of observed markers, $m_t$ in the sequence. Frames and landmarks are modeled as statistically independent:

$$p(M \mid \tilde{M}, \Gamma, \Theta, \beta) \approx \prod_i \prod_t p(m_{i,t} \mid \tilde{m}_i, \gamma_t, \theta_t, \beta). \quad (7)$$

The likelihood $p(m_{i,t}|\tilde{m}_i,\gamma_t,\theta_t,\beta)$ is constructed according to the following Gaussian distribution, and simply asserts that observed markers 117 should be near simulated markers 117:

$$m_{i,t} \sim \mathcal{N}(\hat{m}_{i,t},\sigma_p). \qquad (8)$$

The prior can further be factored into a landmark prior and two body model priors:

$$p(\tilde{m},\beta,\theta_i,\gamma_i) \approx p(\tilde{m}|\beta)p(\beta)\prod_i p(\theta_i)\prod_i p(\gamma_t) \qquad (9)$$

The landmark prior is used to keep markers to a prescribed distance from the surface, and to weakly bias markers towards hand-chosen vertices.

Figure 5:
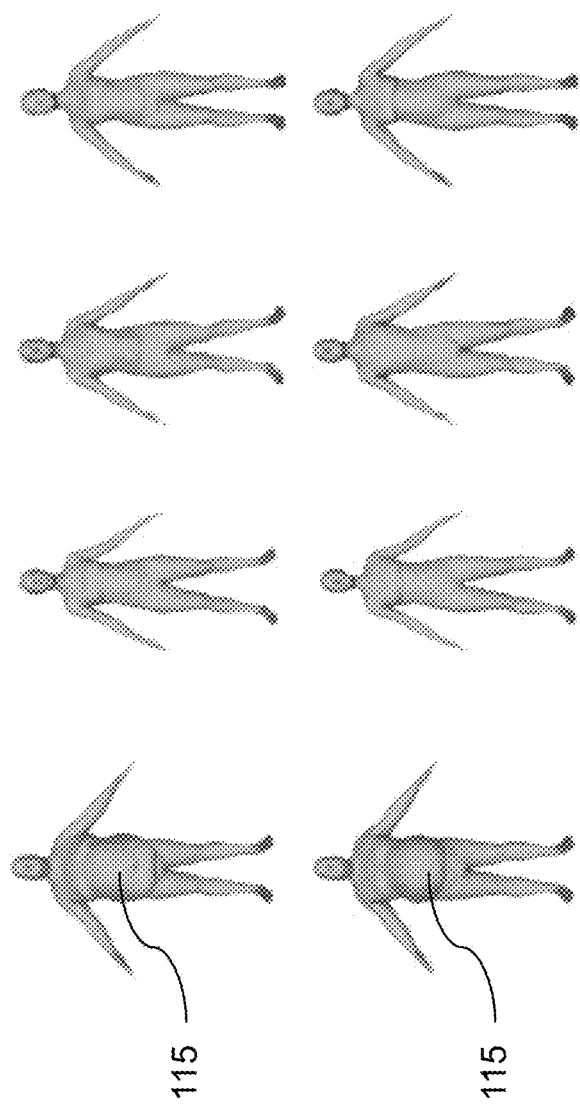
FIG. 5 shows registrations to 3D scans and reconstructions from markers.

FIG. 5 in first row shows registrations to 3D scans and in second row reconstructions from 73 markers 117.

Figure 6:
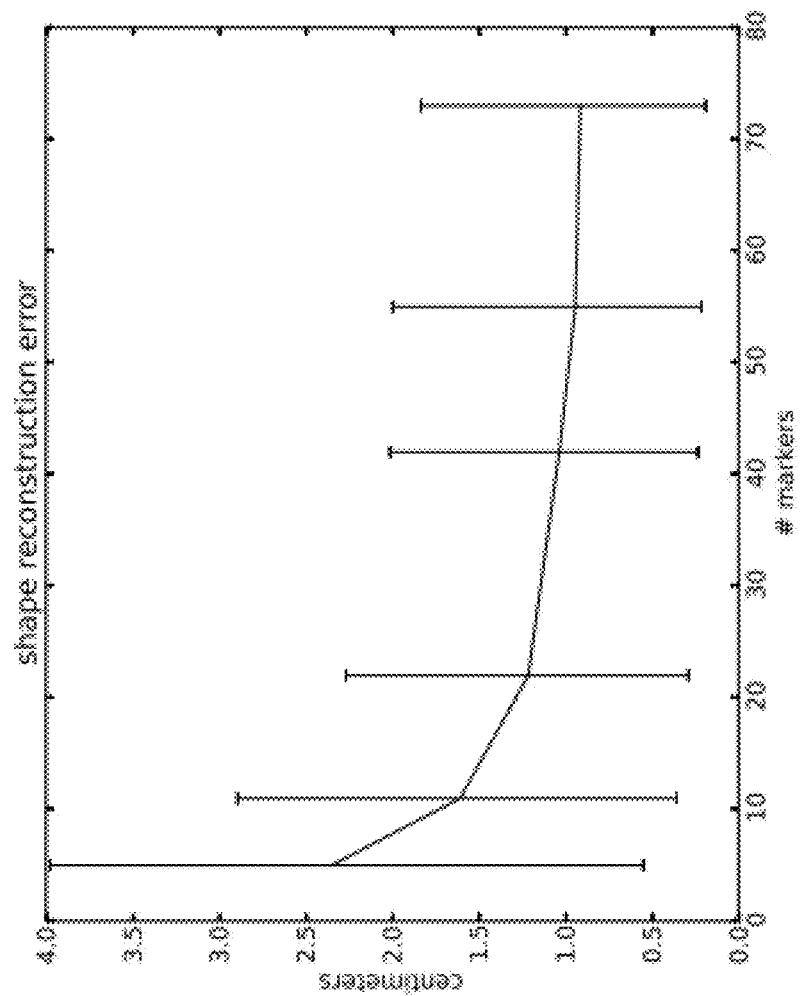
FIG. 6 shows per-vertex distance residuals.

FIG. 6 shows per-vertex distance residuals as a function of the number of markers used. Error bars indicate 5th and 95th percentile. Where r(x,S) denotes signed distance from point x to surface S, $$p(\tilde{m}_i|S,v_i) = p(\tilde{m}_i|S)p(\tilde{m}_i|\hat{v}_i) \qquad (10)$$

$$p(\tilde{m}_i|S) \propto e^{\frac{\|r(m_i,S)-d_i\|^2}{\sigma_r^2}} \qquad (11)$$

$$p(\tilde{m}_i|\hat{v}_i) \propto e^{\frac{\|m_i-\hat{v}_i\|^2}{\sigma_v^2}}. \qquad (12)$$

The pose and shape priors are modeled as Gaussian, with their statistics $\mu_\beta,\mu_\theta,\Sigma_\beta,\Sigma_\theta$ computed naively from the pose and shape training data used to train the BlendSCAPE model:

$$\theta \sim \mathcal{N}(\mu_\theta,\Sigma_\theta) \qquad (13)$$

$$\beta \sim \mathcal{N}(\mu_\beta,\Sigma_\beta). \qquad (14)$$

The prior over translation $\gamma_t$ is considered uniform, and does not contribute meaningfully to the objective.

The objective is to maximize a product of Gaussian probabilities. The sum of the log probabilities is equivalently minimized, which in the case of IID Gaussians means minimizing a sum of squares. The objective is minimized with Powell's dogleg method, using Gauss-Newton Hessian approximation.

The gradients of the objective are computed with algorithmic differentiation, which applies the chain rule to the forward process in order to compute gradients. Only the differentiation of the body model $S_k(\gamma,\theta,\beta)$ and the signed mesh distance r(x,S) were done by hand, to improve runtime performance.

Optimization is done in two stages:

Stage 1. The first stage estimates the marker locations $\tilde{m}$, body shape $\beta$, post $\theta_t$, and body position $\gamma_t$ for a subset of the frames. It cannot added an unlimited number of frames into this stage, because each additional stage adds a pose vector of size $|\theta|$ to the latent variables being optimized and $|\tilde{m}|$ residuals to the output space. In experiments with different numbers of randomly chosen frames little improvement with more than 16 frames is seen. Consequently 16 random frames for Stage 1 are used.

Stage 2. Now the marker locations and body shape 111 are kept fixed and it is optimized only for $\Theta$. Each $\theta_t$ is computed independently. It is not enforced temporal continuity but initialization at the optimization at frame t with the solution at t−1 if it is available. Then a short optimization is run for each time step. Because the shape and marker locations are fixed, the objective function is not coupled across frames as in Stage 1, making optimization more efficient.

The basic version of MoSh estimates a single body shape 111 for each mocap sequence in Stage 1. One way of evaluating the success is to use markers 117 to estimate shape parameters $\beta$, and then fit the body model with that shape 111 fixed to a previously existing registration obtained with the use of a 3D scanner. Vertex distance residuals can then be used to evaluate shape distance.

To quantitatively evaluate the recovered shape 111, 4 subjects (2 women and 2 men) are scanned using a high-quality 3D body scanner (3dMD LLC, Atlanta, Ga.) and the body model is fitted to their scans. A Vicon mocap system (Vicon Motion Systems Ltd, Oxford, UK) is used to capture them with a custom 73-marker set.

Given the dataset of four subjects, aligned the body template to scans of each subject in a neutral pose, as shown in FIG. 3 top. MoSh is used to estimate body shape 111 from the standard 42-marker set used in the CMU database. Using 42 markers, vertex distance residuals (Euclidean distances between matching vertices) are found averaging 1.31 cm. Using 73 markers, the error decreased to 1.14 cm error. Results for the 73 marker reconstructions are shown in FIG. 5 bottom.

The CAESAR dataset consists of a large number of body shapes 111 that are brought into correspondence with the template mesh. These are used to evaluate the effect of the number of markers on reconstruction accuracy. Since no mocap marker data for CAESAR subjects are present, markers on the aligned meshes are simulated (one mesh per subject), body shape 111 from the markers 117 are estimate, and the surface error between the original meshes and the reconstructions is measured.

Residuals are obtained as shown in FIG. 6. Diminishing returns are apparent beyond 70 markers 117. Also notably, the values are consistent with the range that is obtained from the local subjects (between 1-1.5 cm mean vertex distance residuals). Note that this shows that small marker sets, e.g. 42 are reasonable for static body shapes 111. In the next section it is explored what happens with dynamic shapes exhibiting soft-tissue motion.

Figure 7:
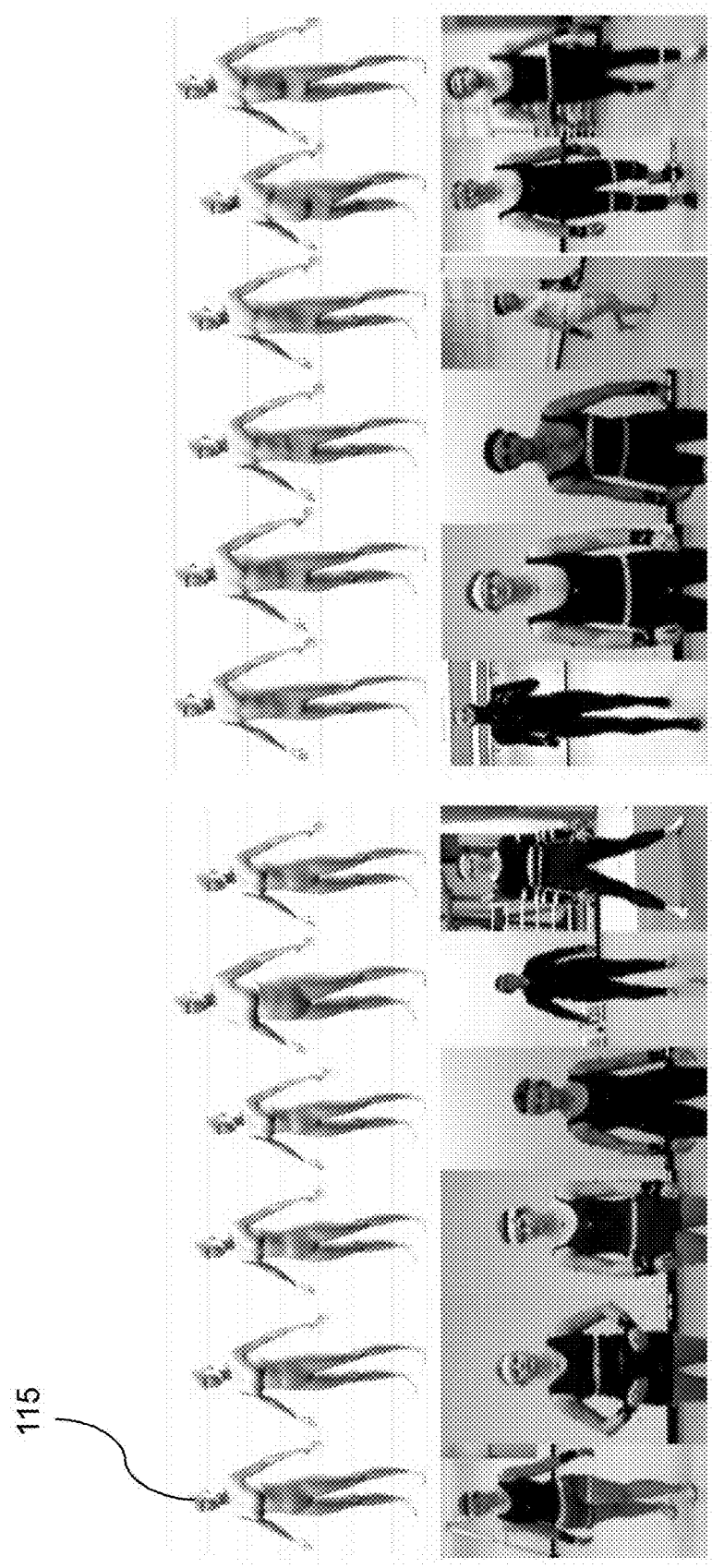
FIG. 7 shows extracted shapes and reference images.

FIG. 7 shows CMU bodies, extracted shapes (top) and reference images (bottom) for several CMU subjects. Shapes are computed with MoSh using the 42 Vicon markers only. A visual inspection of shape recovery from CMU can be seen in FIG. 7, where video frames are shown below reconstructions from Vicon markers. To be clear, MoSh does not use this video frame; it is shown here only for a visual evaluation of rough shape. Since there the CMU dataset has no anthropometric data, a quantitative evaluation is not possible. Run-time for shape reconstruction is half an hour.

Figure 8:
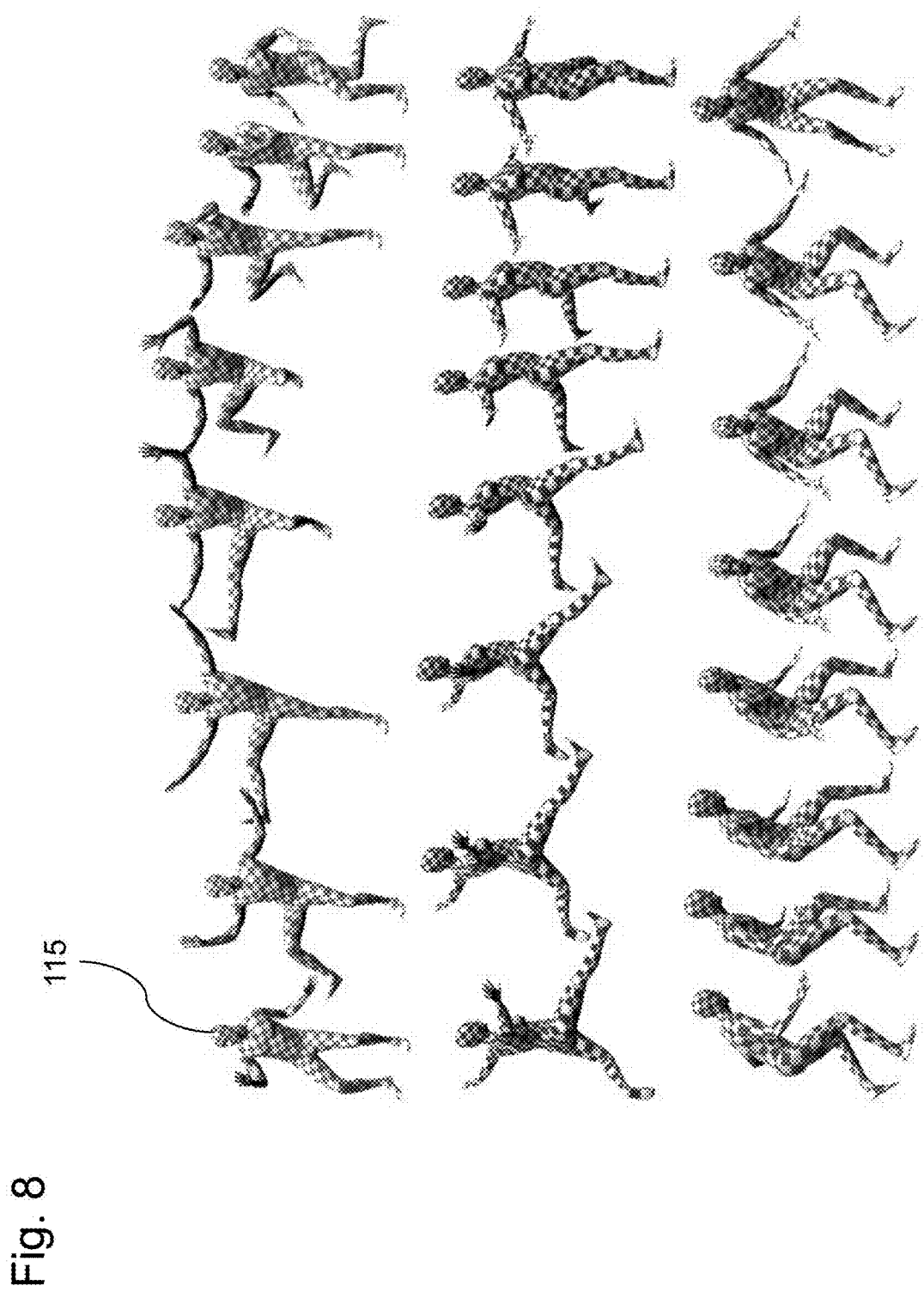
FIG. 8 shows CMU mocap and example meshes.

FIG. 8 shows CMU mocap and example meshes extracted from the CMU mocap dataset for three subjects. Given body shapes 111 and marker locations estimated in Stage 1, the objective function over the pose parameters for a sequence is minimized. FIG. 8 shows some representative frames for some representative sequences in the CMU dataset. The nuance is difficult to illustrate in a static image but this is apparent in the animations. Run-time for pose estimation is 2 seconds per frame.

The body model was learned to represent both shape and posedependent deformations from registrations of static subjects. But many other subtle body shape deformations were not explicitly learned by the model, including muscle contraction, breathing, gravity, external forces, and dynamics. Currently the dynamics of soft tissue cannot be recovered by either 3D scanning systems or sparse motion capture methods.

While the body shape training set does not contain examples of soft tissue dynamics, breathing, or other soft tissue deformations, it does capture many shape variations across the population. Someone breathing in might look just a bit fatter. Someone jumping might look like their chest is in a different place. These differences in body shape 111 can be represented within the shape space.

Earlier it was assumed the body shape 111 is fixed through the sequence. Now to capture these more subtle changes it is allowed for the shape 111 to vary across the sequence. To do so it is allowed β to vary over time, introducing $\beta_t$; also $\sigma_D$ is reduced, because now it can be explicitly accounted for marker variation that could not be accounted for without variation in β.

The shape changes due to soft-tissue dynamics may be subtle and consequently the linear shape space is extended to now use 200 principal components. It is found that empirically this captures a nice range of detail. For the new 120 components, deviations of the coefficients from zero are penalized.

Additionally, to capture soft-tissue motions it is found that a larger marker set is useful. Because the standard marker sets are designed for estimating a skeleton, the markers are mostly placed on rigid body structures. This is another reason why exiting mocap methods lack nuance. To capture dynamics, just the opposite is wanted; the markers have to be on the soft tissue.

Note that dynamics of soft tissue are not modeled. Only the effects of such motions are fitted that are apparent in the marker data. Actually using the MoSh to learn a model of soft-tissue dynamics is an interesting direction for future work. To evaluate soft-tissue motion recovery with MoSh a normal-weight man doing is captured jumping jacks and a normal-weight woman salsa dancing. In both cases the 73-marker set is used.

Figure 9:
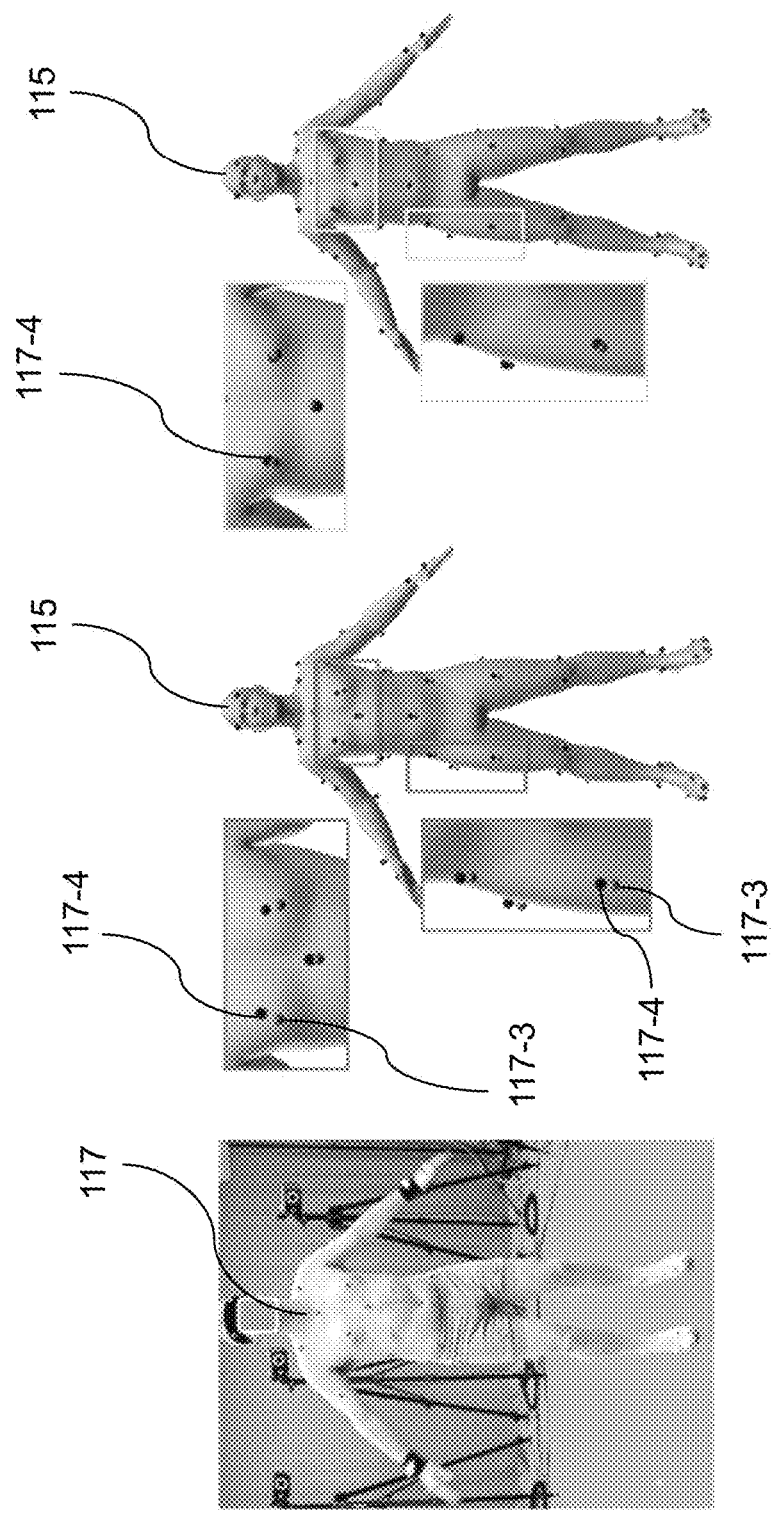
FIG. 9 shows a frame from the jumping-jack sequence.

FIG. 9 shows a motion of soft tissue and a frame from the jumping-jack sequence. Left: frames from a sequence of someone jumping (shown here for reference—video was not synchronized with mocap). Middle: body shape 111 constructed with basic MoSh (body shape 111 fixed throughout the sequence). Right: allowing body shape 111 to change over time captures soft tissue deformations. Lighter balls correspond to the mocap markers 117-3. Darker balls correspond to the predicted marker locations 117-4. Note that in the right image, the predicted markers much more closely match the observed markers but that the body shape 111 does not become unnaturally distorted to fit them.

On the left a frame from the original video for reference is seen. Note the markers on the chest—these move up and down non-rigidly during the motion. The middle frames show reconstructions with basic MoSh, i.e. fixed body shape 111, and the right shows reconstructions using the dynamic version. Allowing shape 111 to vary across frames can improve marker position reconstruction and produces realistic deformations.

MoSh is completely compatible with existing industry-standard mocap systems. It can be used alone or in conjunction with traditional skeletal mocap since no information is lost and MoSh can use exactly the same markers as current systems. The extended MoSh marker sets can be used depending on the required accuracy and the time available for the capture session. If a user is particularly interested in capturing specific shape features (for example breathing), the can design new marker sets and evaluate which marker sets produce the lowest reconstruction error. The hope is that MoSh breathes new life into old mocap datasets and provides an easily adopted tool that extends the value of existing investments in marker-based mocap.

Unlike many methods for extracting skeletons from makers 117, no smoothing of the data is done. This helps preserve nuance but can sometimes result in high-frequency noise, particularly with small marker sets. One could easily add an optional post processing stage to filter/smooth the estimated pose 113. The estimated body pose 113 could also be used to create a virtual marker sequence that could replace the original. This would provide a principled way of fixing occlusions or introducing body-shape-related smoothness.

The transfer of soft tissue dynamics to vastly different body shapes 111 needs more study. A full solution will need to adapt the shape deformation to new body shapes 111; bodies with more fat should jiggle more. This will likely require training data that does not exist today.

Here it is focused on body shape 111 and pose 113, ignoring hands and feet. It should be clear that the extension to feet and hands is straightforward.

Contact with ground could be enforced by placing constraints on foot placement. Interpentration could also be solved for and penalized during optimization. These same techniques could be applied to estimating the motion of cloth from markers or to multiple interacting people. MoSh could be used for virtual film production, allowing a director to see more realistically what an animated character will look like in a scene.

While maker-based motion capture (mocap) is widely used, it is also widely criticized as producing lifeless animations. It is argued that nuance lies in the motion of the body surface and this is captured by sparse marker sets; traditional skeletal animation throws away this detail. A new approach called MoSh (Motion and Shape capture) is demonstrated, that automatically extracts this detail from marker data. MoSh estimates body shape 111 and pose 113 together using marker data by exploiting a parametric model of the human body. A key advance beyond previous work is that MoSh solves for the marker locations relative to the body 115 and estimates body shape 111 directly from the markers without the use of 3D scans.

It is gone further and showed that soft tissue motions can be captured directly from the sparse marker data by allowing body shape 111 to vary over time. MoSh is illustrated by automatically recovering body shape 111, pose 113, and dynamics from archival mocap data. It is also shown the effect of different marker sets on pose and shape accuracy. It is found that we body shape 111 from sparse markers can be accurately estimated, effectively turning the mocap system into a body scanner. Without user input, MoSh produces lifelike animations that have much more subtlety and realism than those produced by existing methods.

Motion Shape Capture from Sparse Markers II

Figure 10:
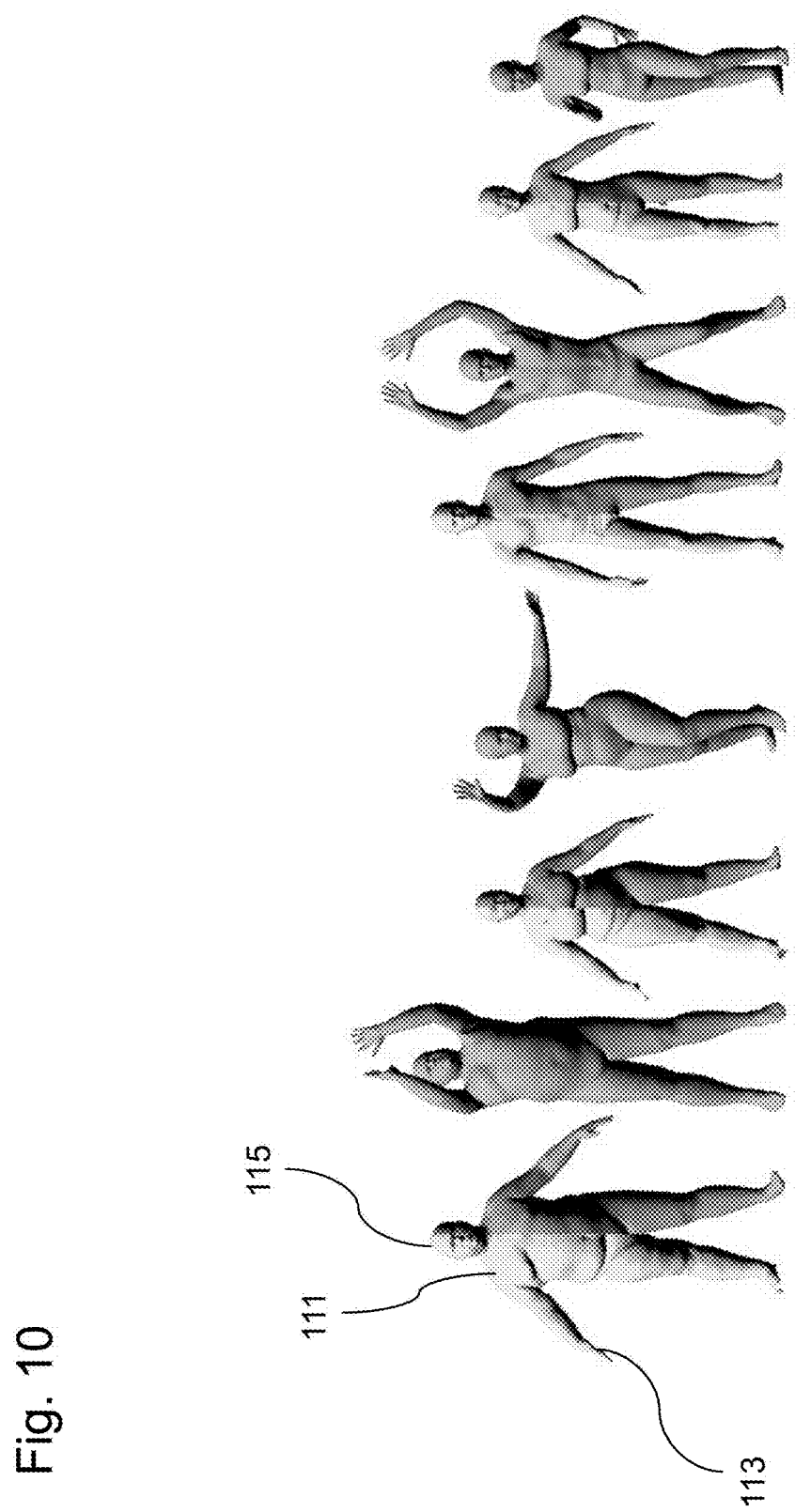
FIG. 10 shows shape from mocap.

FIG. 10 shows shape 111 from mocap. MoSh computes body shape 111 and pose 113 from standard mocap marker sets. Body shapes 111 and poses 113 are recovered with 67 markers 117 and compares the body shapes 111 with 3D scans. While fine details are missing, MoSh enables users of standard mocap to obtain reasonable 3D body shapes 111 from markers 117 alone. Bodies 115 in darker color are estimated from 67 mocap markers 117, while scans in lighter color are captured with a high-resolution 3D body scanner. Split-color bodies 115 compare the shape 111 estimated from sparse markers 117 with scans. MoSh needs only sparse mocap marker data to create animations (darker posed bodies) with a level of realism that is difficult to achieve with standard skeleton-based mocap methods.

While marker-based motion capture (mocap) is widely used to animate human characters in films and games, it is also widely criticized as producing lifeless and unnatural motions. It is argued that this is the result of "indirecting" through a skeleton that acts as a proxy for the human movement. In standard mocap, visible 3D markers 117 on the body surface are used to infer the unobserved skeleton. This skeleton is then used to animate a 3D model and what is rendered is the visible body surface. While typical protocols place markers 117 on parts of the body 115 that move as rigidly as possible, soft-tissue motion always affects surface marker motion. Since non-rigid motions of surface markers 117 are treated as noise, subtle information about body motion is lost in the process of going from the non-rigid body surface to the rigid, articulated, skeleton representation. It is argued that these non-rigid marker motions are not noise, but rather correspond to subtle surface motions that are important for realistic animation.

MoSh replaces the skeleton with 3D parametric body model. Given a standard marker set, MoSh simultaneously estimates the marker locations on a proxy 3D body model, estimates the body shape 111, and recovers the articulated body pose 113. By allowing body shape 111 to vary over time, MoSh is able to capture the non-rigid motion of soft tissue. Previous work on the mocap of such motions relies on large marker sets [Park and Hodgins 2006; Park and Hodgins 2008]. In contrast, it is shown that significant soft tissue motion is present in small marker sets and that capturing it results in more nuanced and lifelike animations. MoSh also recovers qualitatively and metrically accurate body shapes 111, from small numbers of markers.

The basic version of MoSh has five core components. 1) MoSh uses a parametric 3D body model that realistically represents a wide range of natural body shapes 111 poses 113, and pose-dependent deformations. For this a learned statistical body model based on SCAPE is used, as disclosed by [Anguelov et al. 2005]. 2) Marker placement on the human body 115 varies across subjects and sessions, consequently it is not assumed that the exact marker placement is known. Instead, a key contribution of MoSh is that it solves for the observed marker locations relative to the 3D body model. 3) MoSh also simultaneously solves for the 3D body shape 111 of the person that best explains the observed 3D mocap marker data. 4) Steps 2 and 3 above require that it is also simultaneously solved for 3D body pose 113. Components 2-4 are all embodied in a single objective function and this is optimized for a subset of the mocap sequence. 5) In a second stage, MoSh uses the computed body shape 113 and marker locations on the body 115, to estimate body pose 113 throughout a mocap session.

This basic method produces appealing animations but the assumption of a single body shape 111 across the session does not account for the dynamics of soft tissue; for example, the jiggling of fat during jumping. Currently there are no practical technologies for easily capturing these soft-tissue motions. Previous methods have used large marker sets, as disclosed in [Park and Hodgins 2006] but these are time consuming to apply, difficult to label, and suffer from occlusion. These methods also do not apply to archival data. Video-based surface capture methods offer the potential for even greater realism, as disclosed in [de Aguiar et al. 2008; Stark and Hilton 2007], but are not yet mature and are not widely adopted. To capture soft-tissue deformation, it is allowed for the body shape 111 to change over time to better fit the marker motions. The solution uses a low-dimensional shape model to make it practical and penalizes deviations from the fixed body shape 111 estimated without soft-tissue deformation. It is made an assumption that these deformations can be approximated within the space of static human body shape variations; that is, the soft tissue deformations of an individual effectively by is modeled changing their identity. Given a sufficiently rich space of body shape variation, this works surprisingly well.

While body shape 111 and pose 113 can be estimated from standard marker sets and archival mocap sequences, it is gone further to design additional marker sets with greater or fewer markers. Using a principled objective function, and a training set of 3D body meshes, the effect of different marker sets on the accuracy of body shape 111 and pose 113 capture are evaluated. While the standard 47-marker set that is often used for motion capture (e.g. in the CMU dataset) works surprisingly well for recovering both shape 111 and pose 113, it is found that an expanded set, with 20 additional markers, captures more soft tissue motion.

The method is validated with nearly 800 mocap sequences. Since no body scanner or other hardware is required, MoSh can be applied to archival mocap data. To demonstrate this gender, shape, and motion of 39 subjects in the CMU mocap dataset using 47 markers are reconstructed. The resulting animations are nuanced and lifelike and the body shapes 111 qualitatively match reference video. For quantitative evaluation, twenty subjects with widely different body shapes 111 are scanned and MoSh is performed with different numbers of markers 117.

MoSh can be used directly for animation or as a reference for animators. The body shape 111 can be changed to retarget the mocap sequence to new bodies (cf. [Anguelov et al. 2005]). This transfer works for any character with the same topology as the body model. Several cartoon characters are aligned to the mesh and then animated without the labor-intensive process of developing a rigged model or retargeting the skeletal motions. The animations include the transfer of soft tissue motions and it is shown further how these motions can be magnified to produce interesting animations with exaggerated soft-tissue dynamics.

In summary, the main contribution of MoSh is that it provides a fully automated method for "mining" lifelike body shape 111, pose 113, and soft-tissue motions from sparse marker sets. This makes MoSh appropriate for processing archival mocap. By using the same (or slightly augmented) marker sets, MoSh complements, existing marker-based mocap in that animators can extract standard skeletal models from the markers, MoSh meshes, or both.

Figure 11:
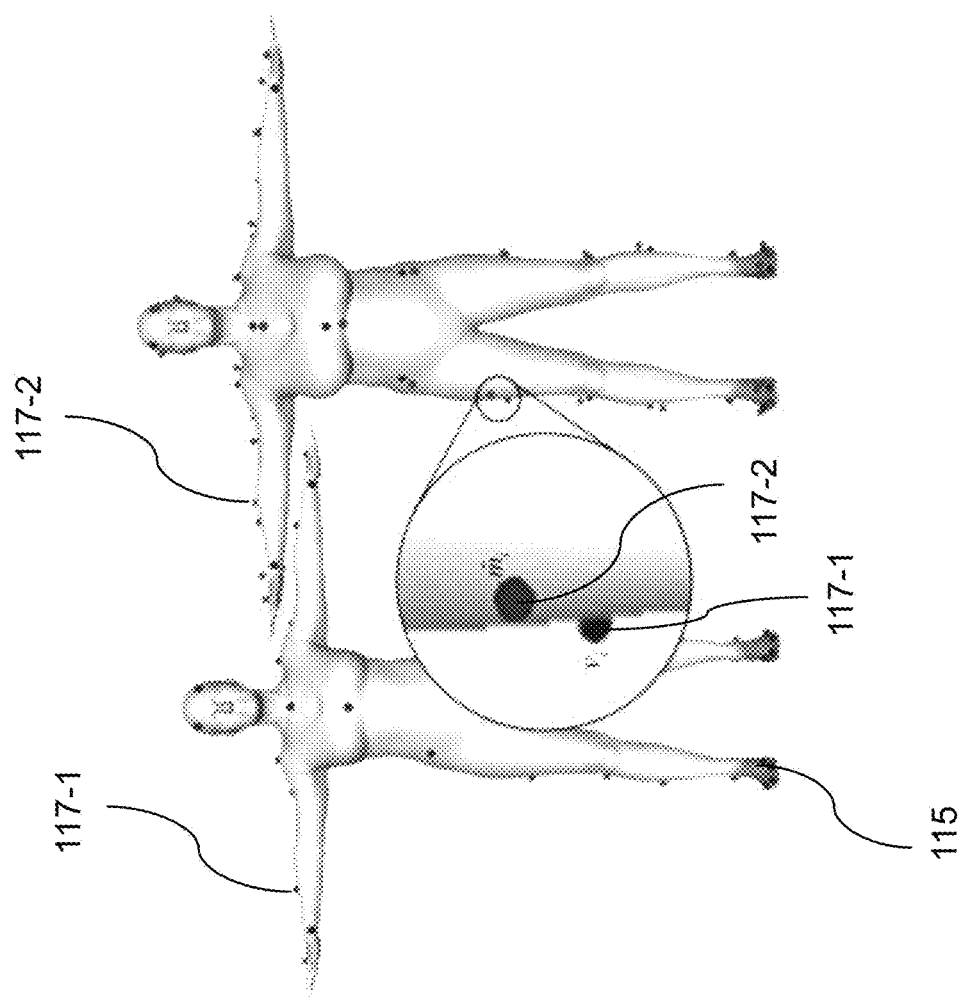
FIG. 11 shows optimizing shape and markers.

FIG. 11 shows optimizing shape 111 and markers 117. Left: initial guess of markers 117-1, $v_i$, on the template shape 111 in the canonical pose. Right: Shape and marker locations after optimization. Optimized marker locations, $\tilde{m}_i$, are shown as markers 117-2. Note that they have moved, as shown in the inset.

Extracting body shape 111 from sparse markers 117 is clearly an ill-posed problem; an infinite number of bodies 115 could explain the same marker data. To infer the most likely body 115 a model of human shape is used that captures the correlations in body shape 111 within the population. For this a learned body model is used that is similar to SCAPE, as disclosed by [Anguelov et al. 2005]. It should be noted however that any mesh model could be used, as long as (1) it allows shape and pose variation, and (2) is differentiable with respect to its parameters.

The body model is a function that returns a triangulated mesh with 10,777 vertices, and is parameterized by a global translation center $\gamma$, a vector of pose parameters, $\theta$, a mean shape, $\mu$, and a vector of shape parameters, $\beta$. Shape 111 is defined in terms of deformations applied to the triangles of a base template mesh. The surface of the body 115 is described as $S(\beta,\theta,\gamma)$, with the coordinates of vertex k notated $S_k(\beta,\theta,\gamma)$. The body mesh is segmented into parts and each part can undergo a rotation defined by $\theta$. The pose parameters $\theta$ consist of 19 angle-axis vectors, whereby length indicates the amount of rotation. Like SCAPE, the function $S(\cdot)$ includes posedependent non-rigid deformations that are learned from bodies 115 in a wide range of poses 113. Body shape 111 is approximated by the mean shape and a linear combination of shape basis vectors; $\beta$ is a vector of these linear coefficients. This shape basis is learned from deformations of training body shapes 111 using principal component analysis (PCA). In what follows, body shape 111 is represented using 100 principal components.

The body shape model is trained from 3803 CAESAR scans of people in an upright pose 113 (approximately 2103 women and 1700 men from the US and EU datasets), as disclosed by ROBINETTE, K., BLACKWELL, S., DAANEN, H., BOEHMER, M., FLEMING, S., BRILL, T., HOEFERLIN, D., AND BURNSIDES, D. 2002. Civilian American and European Surface Anthropometry Resource (CAESAR) final report. Tech. Rep. AFRL-HE-WP-TR-2002-0169, US Air Force Research Laboratory. The posedependent component of the model is learned from 1832 scans of 78 people (41 women and 37 men) in a wide range of poses. The scans are aligned using the technique in [Hirshberg et al. 2012]. Since the model is trained from an extensive set of scans, it is able to realistically capture a wide range shapes and poses. For details of SCAPE, it is referred to [Anguelov et al. 2005].

Note that three body shape models are trained: separate models for men and women, plus a gender neutral model. If the gender of the subject is known, the appropriate model is used. If not, the gender-neutral model is fitted, the gender is inferred, and then a gender specific model is used as described below.

Mocap markers 117 extend from the human body to varying degrees and are placed on the body 115 manually. Precise placement can be difficult, particularly on heavy subjects where fat makes it difficult to palpate boney locations. The result is that it cannot be expected to know the exact marker locations in advance. The first step of MoSh solves for the marker locations, relative to a template body mesh, for a given mocap sequence (or collection of sequences for one subject).

It is assumed that the number of markers and their approximate location relative to a reference template mesh is known. The only manual part of MoSh occurs if a user wants to use a new marker set. In this case they need to identify a template vertex for each marker 117. Notationally, it is said that a user creates a mapping h(i) from marker indices, i, to vertex indices on the template. Each marker 117 requires the user-specification of an expected distance $d_i$ from the marker center to the skin surface. Both the location and the distance can be approximated since these are optimized for each subject.

To parameterize marker locations with respect to the body 115, it is introduced a latent coordinate system that contains markers and the body model in a neutral pose, $\gamma_0, \theta_0$, as in FIG. 11 (left). The purpose of this latent coordinate system is to model the relationship between the body surface and the markers 117 in a pose-independent, translation-independent, fashion. This relationship is then transferred to meshes in observed mocap frames.

Then the default position of the markers, $v_i$, is denoted as, $$v_i(\beta) = S_{h(i)}(\beta,\theta_0,\gamma_0) + d_i N_{h(i)}(\beta,\theta_0,\gamma_0), \quad (15)$$

where $N_k(\beta,\theta,\gamma)$ indicates the vertex normal for index k given body model parameters. Thus $v_i(\beta)$ is the position of the model vertex, offset by a user-prescribed distance, $d_i$, from the surface, in the latent coordinate system, corresponding to marker i. These markers 117-1 are illustrated as balls in FIG. 11.

Defining the marker set needs to be done once and then it is used for any subject captured with that marker set. For example, this is done once for the 47-marker Vicon set and used this for all mocap sequences in the CMU database.

The default markers, $v_i$ are approximated and below it is optimized to solve for the body shape, $\beta$, and the actual location of the latent markers, $\tilde{m}_i$, for a given subject and mocap sequence. Let $\tilde{M}$ denote the collection of latent markers. Notationally, i is used to indicate marker number and t to indicate the mocap sequence frame number. Observed markers are denoted $m_{i,t}$ individually and $M_t$ together. From a collection of $M_t$ the latent markers $\tilde{M}$ are estimated. These markers 117-2 are shown as balls in FIG. 11.

To that end, a function $\hat{m}(\tilde{m}_i,\beta,\theta_t,\gamma_t)$ is defined that maps latent markers to the world given a particular shape 111, pose 113, and location of the body 115. These are called "simulated markers". Intuitively, it is solved for the shape, pose, body location, and latent marker locations $\tilde{m}_i$ such that, when projected into the mocap sequence, the simulated markers match the observed markers $M_t$.

This requires a mapping from local surface geometry to a 3D marker position that can be transferred from the latent coordinate system to the observed markers resulting from different poses. A marker position is represented in an orthonormal basis defined by its nearest triangle in the latent coordinate system. That basis is defined by three vectors: the triangle normal, one of the triangle's normalized edges, and the cross product between those two. This is geometrically depicted in FIG. 12 (left).

Figure 12:
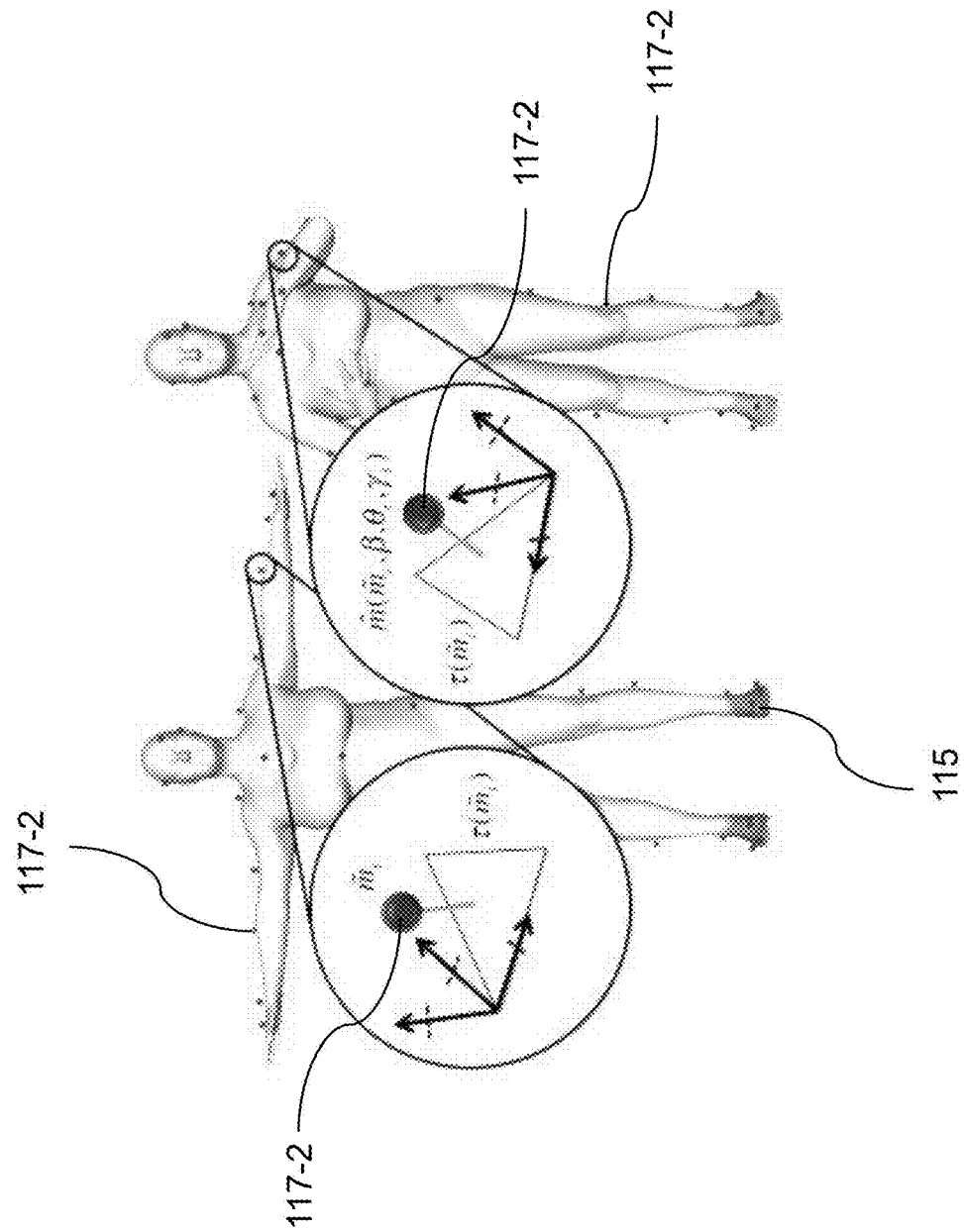
FIG. 12 shows marker transformations.

FIG. 12 shows marker transformations. In the latent coordinate space (left) a marker 117-2, $\tilde{m}_i$ is projected into a basis defined by the nearest vertex: specifically by its normal, an arbitrary normalized edge, and the cross product between them. This provides a pose invariant representation for the marker 117. When the body pose changes (right), the location of the marker, $\hat{m}(\tilde{m}_i,\beta,\theta_t,\gamma_t)$, is computed in the observed frame.

The rigid transformation matrix that projects $\tilde{m}$ into the basis for closest triangle $\tau(\tilde{m})$ in the mesh, is denoted as $B_{\tau(\tilde{m})}(\beta,\theta,\gamma)$. Then a simulated marker position $\hat{m}(\cdot)$ is defined as $$\hat{m}^*(\tilde{m},\beta,\theta_t,\gamma_t) = B_{\tau(\tilde{m})}(\beta,\theta_t,\gamma_t) B_{\tau(\tilde{m})}^{-1}(\beta,\theta_0,\gamma_0) \tilde{m}^* \quad (16)$$

where $\tilde{m}^* = [\tilde{m}^T,1]^T$ and $\hat{m}^*(\cdot) = [\hat{m}(\cdot)^T,1]^T$ denote the marker locations in homogeneous coordinates. Eq. 16 can be seen as having two steps. First, the matrix $B_{\tau(\tilde{m})}^{-1}(\beta,\theta_0,\gamma_0)$ transforms $\tilde{m}^*$ from a 3D latent-space position into a coordinate vector in the space of its local basis. In the second step, $B_{\tau(\tilde{m})}(\beta,\theta_t,\gamma_t)$ maps this coordinate vector into a 3D observed-space position, $\hat{m}^*(\cdot)$, defined by the specific position and pose, $\theta_t,\gamma_t$. This is illustrated in FIG. 12 (right).

With the marker parameterization defined, next the objective function is defined that is used to estimate marker positions, shape 111, pose 113, and non-rigid motion.

Let sequences of body pose $\theta_{1...n}$, and position $\gamma_{1...n}$, with n time instants be denoted as $\Theta$ and $\Gamma$ respectively. It is wished to estimate the latent markers $\tilde{M}$, poses $\Theta$, body locations $\Gamma$, and body shape $\beta$, such that the simulated markers $\hat{m}(.)$ match the observed markers $m_{i,t}$. To do so it is defined an objective function with several terms.

The data term, $E_D$, is the sum of squared distances between simulated and observed landmarks:

$$E_D(\tilde{M}, \beta, \Theta, \Gamma) = \sum_{i,t} \|\hat{m}(\tilde{m}_i, \beta, \theta_t, \gamma_t) - m_{i,t}\|^2. \quad (17)$$

Note that distances are measured in cm.

A surface distance energy term, $E_S$, encourages markers 117 to keep a prescribed distance from the body surface in the latent coordinate system. Let $r(x,S)$ denote the signed distance of a 3D location x to the surface S. Then $$E_S(\beta, \tilde{M}) = \sum_i \|r(\tilde{m}_i, S(\beta, \theta_0, \gamma_0)) - d_i\|^2. \quad (18)$$

Since the marker locations are roughly known to begin with, estimated latent markers are penalized if they deviate from this. The energy term $E_I$ regularizes the adjusted marker 117 towards its original position $$E_I(\beta, \tilde{M}) = \sum_i \|\tilde{m}_i - v_i(\beta)\|^2. \quad (19)$$

Also pose and shape priors are defined to regularize the estimation of body shape 111 and pose 113. These are modeled as Gaussian, with their statistics $\mu_\beta$, $\mu_\theta$, $\Sigma_\beta$, $\Sigma_\theta$ computed from the pose and shape training data used to train the body model. $\beta$ and $\theta_t$ are regularized by penalizing the squared Mahalanobis distance from the mean shape and pose:

$$E_\beta(\beta) = (\beta - \mu_\beta)^T \Sigma_\beta^{-1} (\beta - \mu_\beta) \quad (20)$$

$$E_\theta(\Theta) = \sum_t (\theta_t - \mu_\theta)^T \Sigma_\theta^{-1} (\theta_t - \mu_\theta). \quad (21)$$

It is also added a velocity constancy term $E_u$ that helps to smooth marker noise by a small amount:

$$E_u(\Theta) = \sum_{t=2}^{n} \|\theta_t - 2\theta_{t-1} + \theta_{t-2}\|^2. \quad (22)$$

The objective in total is the sum of these terms, each weighted by its own weight, $\lambda$:

$$E(\tilde{M}, \beta, \Theta, \Gamma) = \sum_{\omega \in \{D, S, \theta, \beta, I, u\}} \lambda_\omega E_\omega(\cdot). \quad (23)$$

The objective function above is quite general and it enables to solve a variety of problems depending on what is minimized and what is held constant. In all cases, optimization uses Powell's dogleg method, with Gauss-Newton Hessian approximation. The gradients of the objective function are computed with algorithmic differentiation. Only the differentiation of the body model $S_k(\beta,\theta,\gamma)$ and the signed mesh distance $r(x,S)$ were done by hand, to improve runtime performance.

There are two main optimization processes. The first estimates time-independent parameters (body shape $\beta$ and marker placements $\tilde{M}$), while the second estimates time-dependent parameters $\Theta = \{\theta_1 \ldots \theta_n\}$, $\Gamma = \{\gamma_1 \ldots \gamma_n\}$.

Body Shape and Latent Markers: For a given mocap sequence (or set of sequences for the same subject), optimization always starts by estimating the latent marker locations $\tilde{M}$, body shape $\beta$, poses $\Theta$, and body positions $\Gamma$ for a subset of the frames. The latent marker locations and the body shape are assumed to be time independent and can be estimated once for the entire sequence (or set of sequences).

Notably, the transformation from latent to observed coordinate systems is continuously re-estimated during the optimization of marker placement. The assignment of nearest neighbors, the local basis itself, and the coefficients relating a marker 117 to that basis undergo continual adjustment to allow refinement of the relationship between markers and the body surface.

The $\lambda$ values in Eq. 23 are: $\lambda_D=0.75$, $\lambda_S=100.0$, $\lambda_I=0.25$, $\lambda_\beta=1.0$, $\lambda_\theta=0.25$, $\lambda_u=0$.

The $\lambda$ values were initialized to normalize each term by an estimate of its expected value at the end of the optimization; in particular, the distance-based $\lambda$ values ($\lambda_D$, $\lambda_S$, $\lambda_I$) have interpretations as inverse variances with units of $$\frac{1}{cm^2}.$$

These $\lambda$ values where then empirically refined.

The velocity term is not used in this stage ($\lambda_u=0$) because it is optimized over random disconnected frames.

To help avoid local optima, the optimization is run in six stages, starting with strong regularization and then gradually decreasing this. Specifically, the regularization weights $\{\lambda_\theta, \lambda_\beta, \lambda_I\}$ are lowered from being multiplied by 40, then by 20, 10, 4, 2, and finally 1. Note that these regularization terms are linear and quadratic in contrast to the data term, which is non-linear. Similar to graduated non-convexity schemes, by increasing the regularization weights the objective function is made more convex, potentially helping the optimization avoid local optima during early stages of the process. In practice this is found to work well.

Computational cost increases with the number of frames used to estimate the parameters since each frame requires its own pose $\theta_t$. For efficiency this optimization is performed using a randomly selected subset of mocap time instants. Experiments are run with different numbers of randomly chosen frames and saw little improvement with more than 12 frames. Consequently 12 random frames for all experiments are used here.

Pose: Motion capture now becomes the problem of estimating the pose of the body, $\theta_t$, and body position, $\gamma_t$, at each time instant given the known body shape 111 and latent markers 117. The optimization at frame t is initialized with the solution at t-1 if it is available and then a short optimization is run for each time step.

For pose estimation, the values are now: $\lambda_D$=0.75, $\lambda_S$=0, $\lambda_I$=0, $\lambda_\beta$=0, $\lambda_\theta$=1.0, $\lambda_u$=6.25. Note that now the velocity smoothness term, $\lambda_u$ is employed. A weight of zero means that this term is not used and the corresponding parameters are not optimized. Specifically, it is not optimized the marker locations or body shape. However a pose prior, $\lambda_\theta$=1.0, is used to penalize unlikely poses. Here the staged regularization is not used because the optimization begins close to the minimum and converges quickly.

Pose and Soft Tissue Motion: In the optimization above it is assumed that body shape 111 and latent marker locations do not change. To capture soft tissue motions it is now allowed for the body shape 111 to vary across the sequence while keeping the marker transformation fixed. Still β is denoted as a shape 111 estimated in the first stage, but now the time-varying deviations in shape from β are denoted as ={$β_1 \ldots β_n$}, such that a person's shape 111 at time t is now $β+β_t$.

To regularize the $β_t$, one additional energy term is added to Eq. 23:

$$E_\Delta(B) = \sum_t \|\beta_t\|^2 \quad (24)$$

set $\lambda_\Delta$ to 0.25, adding $\lambda_\Delta E_\Delta(\bullet)$ in Eq. 23. This term allows body shape 111 to change over time while regularizing it to not deviate too much from the person's "intrinsic shape", β.

While the body shape training set does not contain examples of soft tissue dynamics, it does capture many shape variations across the population. These are exploited to capture soft tissue deformations during motion. Someone inhaling, for example, might look like a different person with a higher chest or a bigger stomach. When someone jumps up and down, the chest changes in ways that resemble the chests of other people. It is interesting, and perhaps surprising, that the shape variations between people can be used to approximate the shape variation of an individual due to dynamics. Presumably there are soft-tissue deformations that cannot be explained this way but, given sufficiently many training body shapes 111, and sufficiently many principal components, it is posit that a wide range of such deformations are representable. It is suspected, however, that training shapes specific to soft-tissue deformations could be used to learn a more concise model. Note further that dynamics of soft tissue are not modeled, it is only approximated what is present in the mocap marker data.

Since standard marker sets are designed for estimating a skeleton, the markers are mostly placed on rigid body structures to minimize soft tissue motion. This is another reason why existing mocap methods lack nuance. Consequently to capture soft tissue dynamics, it is wanted just the opposite; markers are on the soft tissue. This is considered below.

Run Time: Shape and marker estimation requires about 7 minutes. Pose estimation without soft tissue estimation takes about 1 second per frame; pose estimation with soft tissue estimation requires about 2 seconds per frame.

Figure 13:
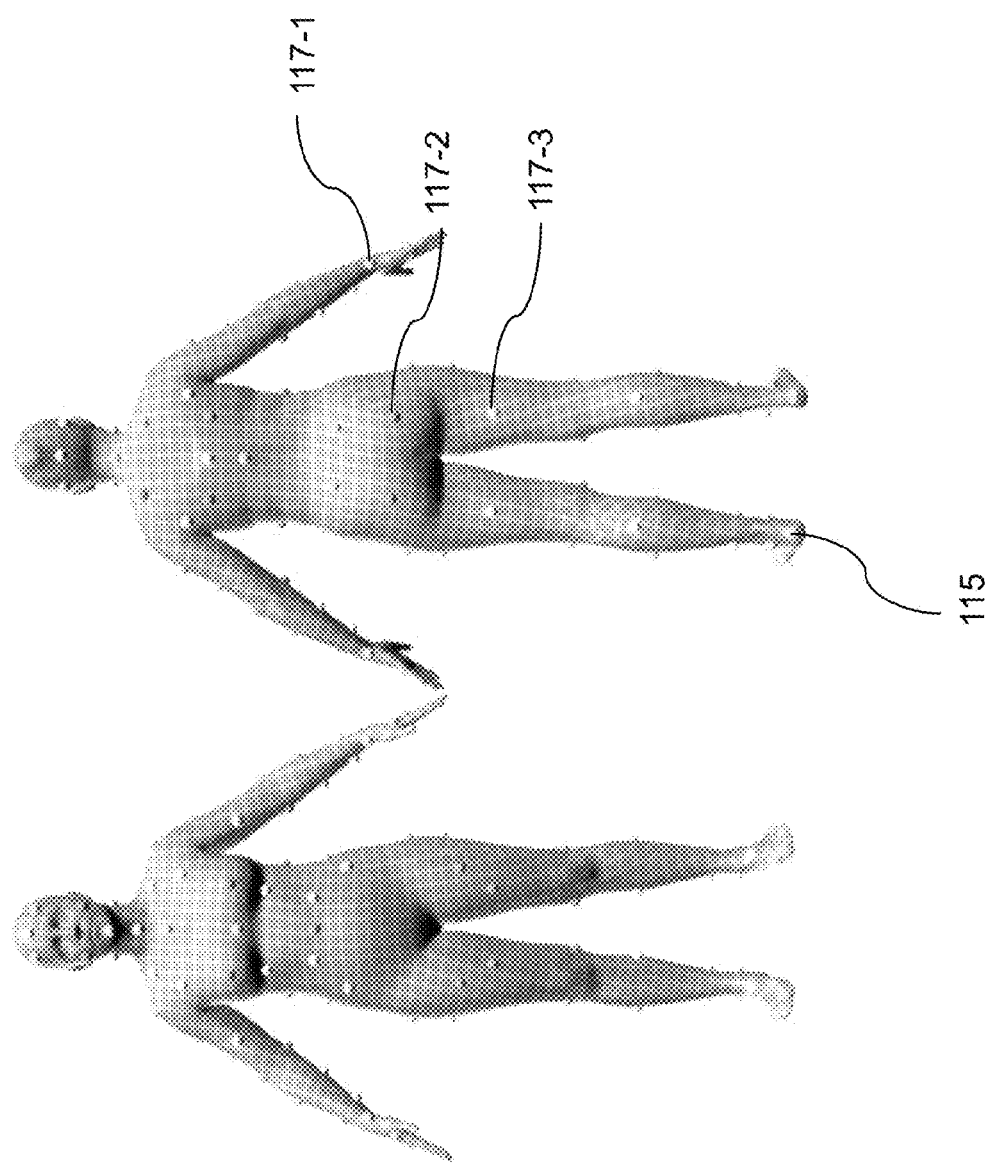
FIG. 13 shows marker sets.

FIG. 13 shows marker sets. The union of all markers 117 illustrates the 114 possible markers 117 that are considered. Light grey markers 117-1 correspond to a standard 47-marker Vicon set. The 20 darker markers 117-2 were found to improve shape estimation the most. The union of light grey and darker markers 117-1 and 117-2 corresponds to the 67-marker set used for capturing shape and soft-tissue motion. Lighter markers 117-3 were deemed redundant and were not used. The standard 47-marker set comprises light grey markers 117-1. Lighter and darker markers 117-3 and 117-2 correspond to the set of additional markers 117 that are considered. Using the greedy method, it is found that the lighter markers 117-3 were not as useful for estimating shape as the darker markers 117-2.

Body shape estimation from motion capture depends on the number and placement of markers; here it is proposed a method for constructing a new marker set to improve body surface reconstruction. To be practical a marker set must be simple, make sense to the technician applying it, be repeatable across subjects, and take into account self-occlusion, self-contact, and the impact on subject movement. Consequently it is started with a standard marker set and additional symmetrical marker locations are proposed for a total of 114 candidate markers as shown in FIG. 13.

Then these putative markers are evaluated to determine how important the different markers are for shape recovery. For this a set of 165 meshes of 5 females of different shapes is used in a variety of poses selected from the FAUST dataset, as described in [Bogo et al. 2014]. A template mesh is aligned to each of the 3D scans resulting in a set of registered meshes, $R^z$, z=1 ... 165, in which all vertices are in correspondence across the 165 instances. The 114 markers are associated with vertices of the template and then body shape is estimated from different subsets of the markers. The accuracy of the result is evaluated in terms of the Euclidean distance between the vertices of the estimated and true mesh. Specifically the root mean squared error (RMSE) is computed over all the vertices (including the subset used for fitting) for all meshes.

More formally, given a maximum number of markers, c, a subset, T, of the mesh vertices, A, is sought that enables the most accurate estimation of body shape. This subset T is the one that minimizes a cost $E_M(T)$; that is $$T^* = \underset{T \subseteq A, |T|=c}{\operatorname{argmin}} E_M(T). \quad (25)$$

Notationally, now body model parameters {β,θ,γ} are abbreviated as P. Also vertex k of registered mesh z is denoted as $R_k^z$. The best parameters $P^*(\{R_j^z | j \in T\})$, given access only to subset T of the vertices for registered mesh z, are defined as $$P^*(\{R_j^z | j \in T\}) = \underset{P}{\operatorname{argmin}} \sum_{i \in T} \|S_i(P) - R_i^z\|^2. \quad (26)$$

The cost of choosing subset T takes into account the distance between all vertices i∈A across all the registered meshes z∈Z={1 ... 165}

$$E_M(T) = \sum_{i \in A, z \in Z} \|S_i(P^*(\{R_j^z | j \in T\})) - R_i^z\|^2. \quad (27)$$

Note that the RMSE is $(E_M(T)/(|A||Z|))^{1/2}$.

Evaluating all possible subsets of 114 markers is infeasible so a greedy approach is taken. If there are currently N markers, one is removed, the cost for the N−1 possible sets is evaluated, and the deleted marker 117 is selected that produces the lowest error. This marker 117 is removed and it is repeated.

Figure 14:
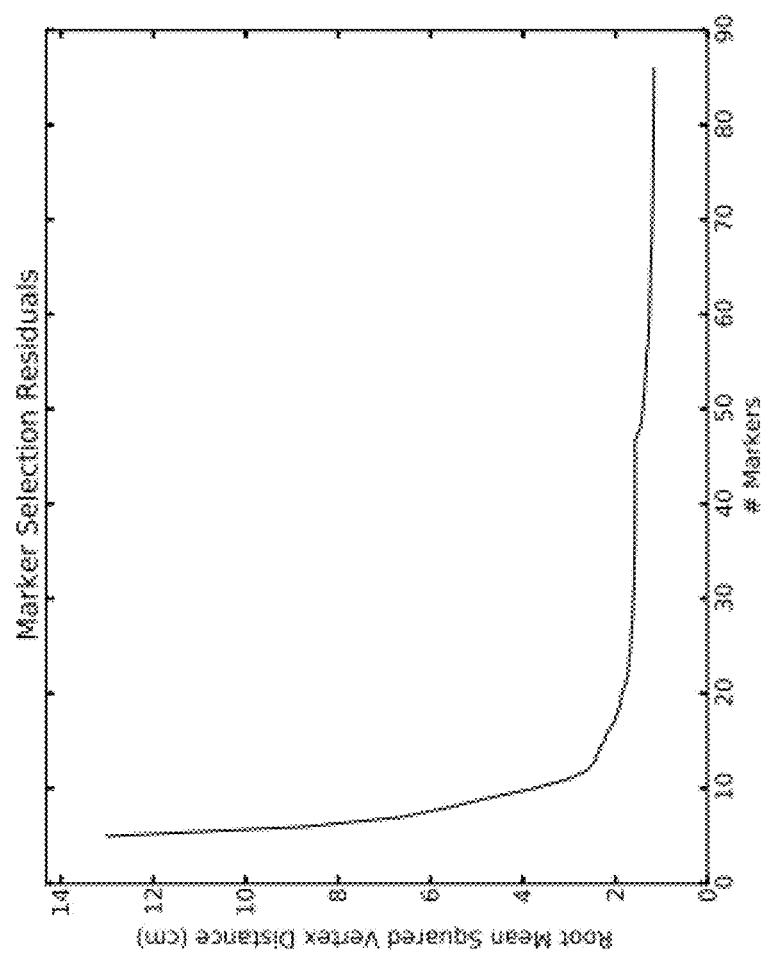
FIG. 14 shows marker selection residuals.

FIG. 14 shows marker selection residuals. The plot shows the mesh shape reconstruction error as a function of marker count. FIG. 14 shows a plot of the RMSE for different numbers of markers. Note that here it is started with the 47-marker set and markers are subtracted from it and markers are added to it. Surprisingly one can remove markers from the standard set and still obtain reasonable shape estimates down to about 25 markers 117. It is decided to keep the original set and add the 20 additional darker markers 117-2. The addition of markers 117-2 to the 47 results in a noticeable decrease in RMSE. Note that a similar error to the set of 67 could be obtained with fewer markers 117 by dropping some of the original 47. To enable comparison with CMU results, however, it is decided to preserve the 47 and add to this set.

The first stage of optimization is evaluated, which computes the body shape 111 and marker locations. To compare estimated body shapes 111 to real ones, 20 subjects are scanned using a high-resolution 3D body scanner (3dMD LLC, Atlanta, Ga.). Before scanning, all subjects gave informed written consent. Additionally, 10 of the subjects were professional models who signed modeling contracts that allow us to release their full scan data.

A Vicon mocap system (Vicon Motion Systems Ltd, Oxford, UK) is also used to capture subjects with 89 markers. The 89 markers were selected using the marker optimization analysis from the full set of 114, evaluated above. At most 67 markers 117 are used for shape and pose estimation; unused markers 117 prove valuable to evaluate held-out marker error. In all cases the optimization is used with soft-tissue deformation. Error is processed and evaluated using, a total of 73 mocap sequences.

The goal is to estimate a body shape 111 that minimizes 3D body shape reconstruction error. This error is measured in two different ways: as held-out marker error and as mesh registration error. Held-out marker error reveals how well marker locations can be predicted that were not used by the optimization: for example, if 47 of the markers are used to estimate the body shape 111 then the remaining markers are used to estimate held-out error.

Figure 15:
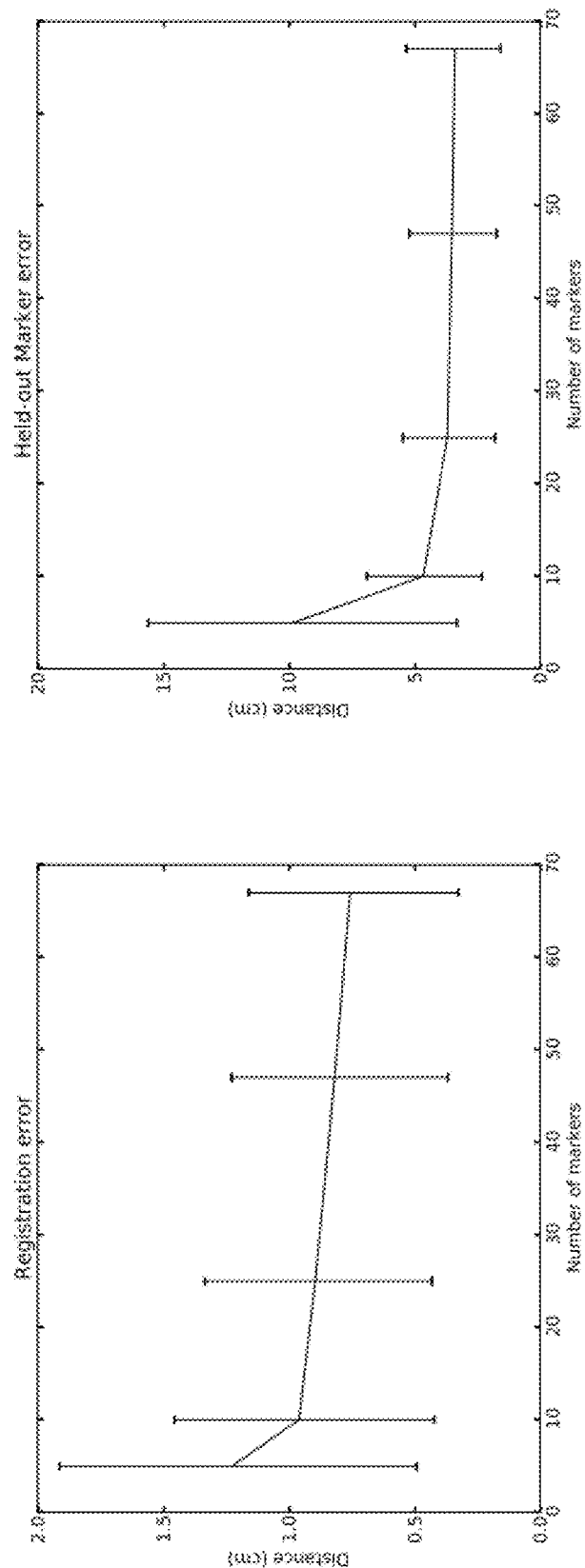
FIG. 15 shows effects of marker number on reconstruction error.

FIG. 15 shows effects of marker number on reconstruction error. The mean and standard deviations of distance residuals indicate how the marker number affects reconstruction. Left: Shape reconstruction error. This is computed as the mean absolute distance between the true body shape (as represented by the alignment of the template to a scan) and the body shape estimated by MoSh reposed to match the registered mesh. Right: Held-out marker error across all sequences. This measures errors in both shape and pose but is inflated by marker placement error and marker movement. In both plots, 68.2% (±1) of the residuals are contained between the error bars.

As shown in FIG. 15 (right), the mean distance for held-out markers 117 drops to approximately 3.4 cm when 67 markers 117 are used. Note that these errors include deviations in placing markers 117 on a subject, which can easily exceed a centimeter. Specifically, when shape 111 is estimated from a subset of markers 117, the placement of the held-out markers 117 is not optimized. So this error combines human placement error with errors in soft-tissue motion of the held-out markers that are not predicted by the subset used for fitting.

After about 25 markers the improvement is very gradual. This is interesting because it suggests that small marker sets can give good estimates of body shape 111. Note that this evaluation uses all 73 mocap sequences and hence evaluates how well MoSh explains marker motions due to changes in both shape 111 and pose 113.

Figure 16:
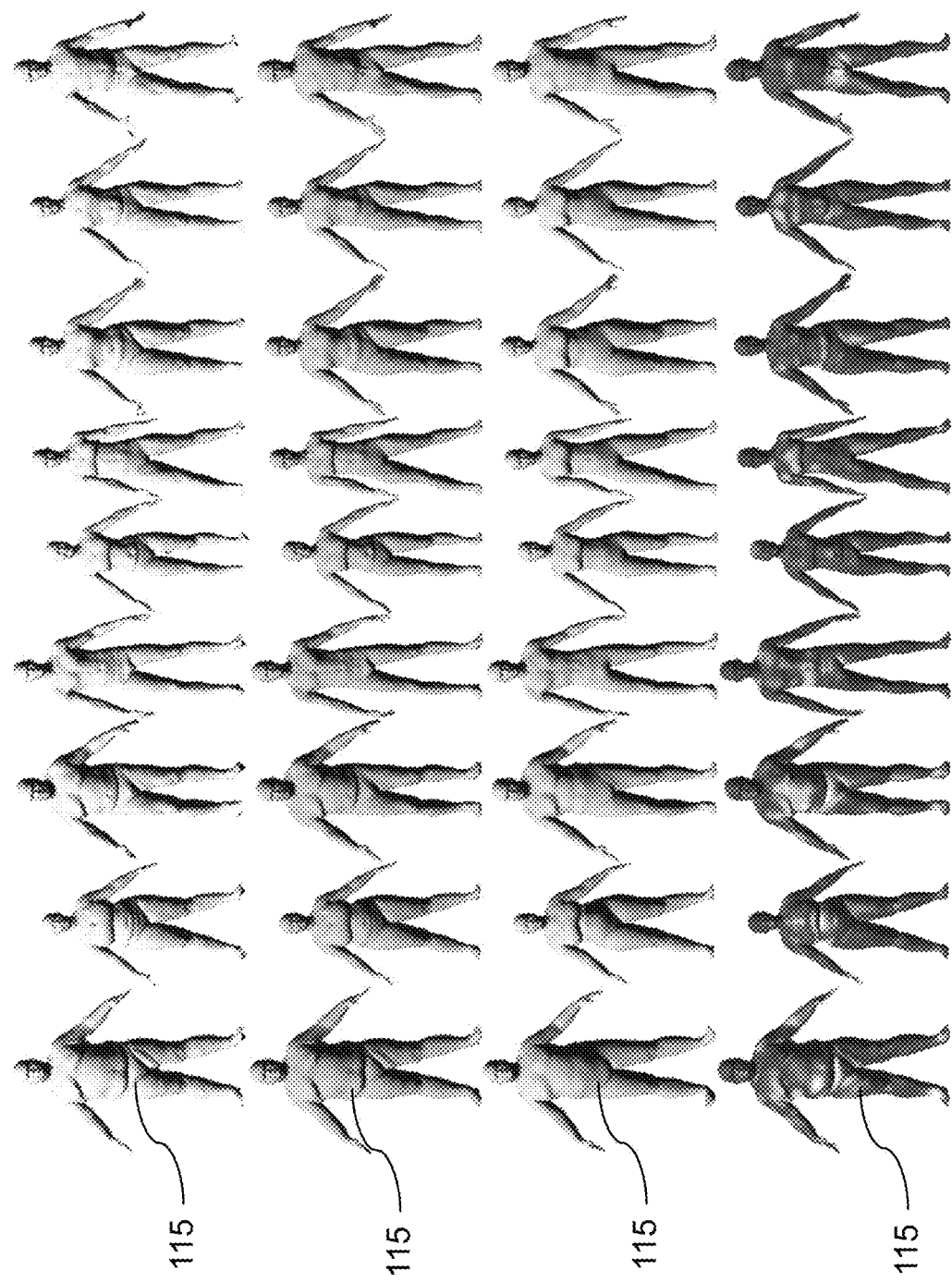
FIG. 16 shows shape reconstruction.

FIG. 16 shows shape reconstruction. First row: raw 3D scans from a high-resolution scanner. Second row: registered meshes obtained by precisely aligning a template mesh, with the same topology as the model, to the scans. These registered meshes faithfully capture the body shape 111 and are used for the quantitative analysis. Third row: the model with shape, β, estimated from only 67 markers. Here the pose, θ, of the model is estimated to match the registered meshes to facilitate comparison. Bottom row: Distance between second and third rows. The heat map shows Euclidean distance from the registered mesh to the nearest point on the surface of the body 115 estimated by MoSh; dark means zero and light means ≥4 cm.

Example 3D scans of several subjects are shown in FIG. 16 (row 1). For each subject a template mesh is aligned to the scan and this template mesh has the same topology as the MoSh body model (FIG. 16 row two); this produces a registered mesh that is used for evaluation. Note that the registered meshes faithfully represent the scans and conform to the mesh topology of the model but do not have holes. Registration error is a measure of how well a subject's registered mesh can be explained in terms of average vertex-to-vertex mesh distance. Recovered body shapes 111 using 67 markers are shown in FIG. 16 row three. Here the MoSh result is posed in the same pose 113 as the scan. Given that MoSh results in a shape vector β, {θ,γ} are adjusted for a body model to minimize model-to-registration distance. The heat map in the bottom row of FIG. 16 shows the distance from the MoSh shape to the registered mesh, illustrating how well MoSh approximates the shape from 67 markers 117.

This registration error is shown in FIG. 15 (left). Registration error behaves much like held-out marker error, except it is uniformly smaller. Unlike the held-out experiment, here it is only needed to explain shape 111 and not both pose 113 and shape 111. Shape estimates are obtained from 12 mocap frames and are well constrained.

While large marker sets like those used in [Park and Hodgins 2006] certainly contain more information, it is seen in FIG. 15 (left) diminishing returns with larger marker sets. The ideal number of markers is likely related to the resolution of the mesh.

Figure 17:
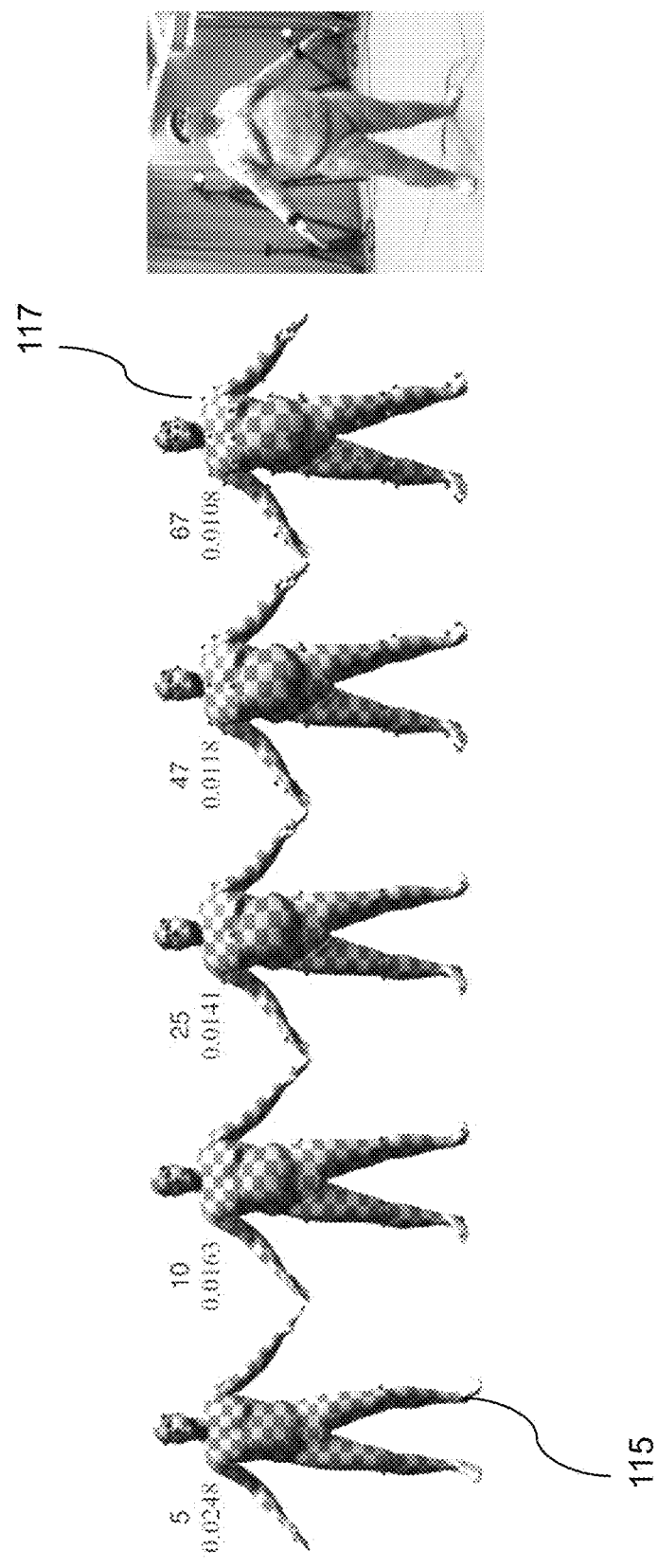
FIG. 17 shows shape from markers.

FIG. 17 shows shape from markers. The effect of the number of markers (5, 10, 25, 47, 67) on the registration error (in m) of the estimated shape is shown. Far right: reference image of the subject. To give some insight into what these numbers mean, FIG. 17 shows body shape 111 for one subject reconstructed using different numbers of markers 117. Here markers 117 are selected based on the greedy evaluation strategy. What is surprising is that with only 10 markers 117, a shape 111 is got that roughly captures the person's size. Note that the registration error decreases as more markers 117 are added; the numerical results show the registration error in m.

For the 10 models, scans, aligned meshes, mocap sequences, and MoSh fits can be provided. This data allows others to estimate shape 111 from the same sequences and compare with both the ground truth shape 111 and the results.

Figure 18:
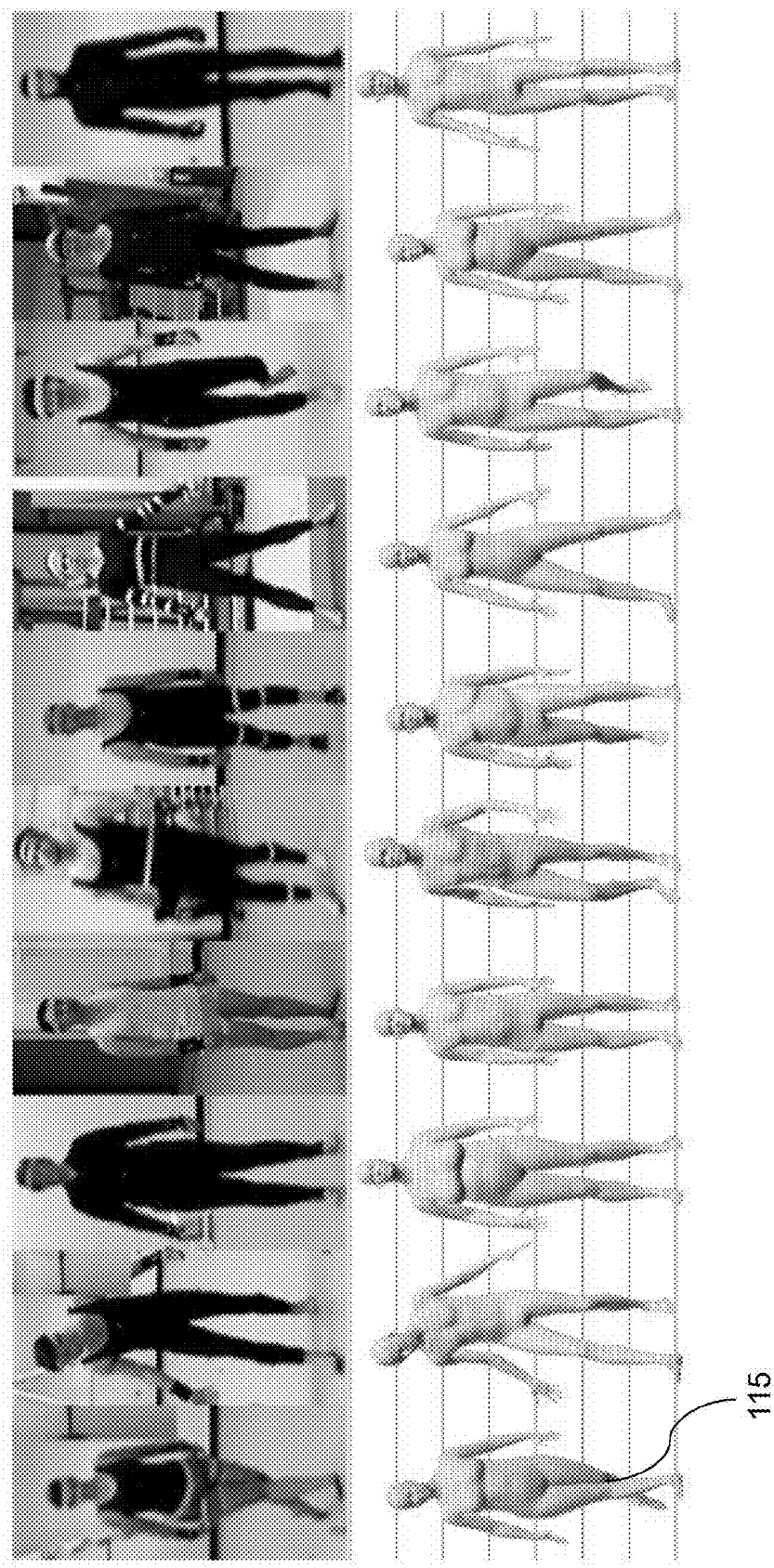
FIG. 18 shows CMU bodies.

FIG. 18 shows CMU bodies and extracted shapes 111 (bottom) and reference images (top) for several CMU subjects. Shape 111 and pose 113 is computed with MoSh using 47 Vicon markers only.

While a ground truth shape 111 for the CMU dataset is not given, results can be evaluated qualitatively. A visual inspection of shape recovery from CMU can be seen in FIG. 18, where video frames are shown above the bodies and poses estimated from 47 standard markers. To be clear, MoSh does not use this video frame; it is shown here only for a visual evaluation of rough shape. Since the CMU dataset has no anthropometric data, a quantitative evaluation is not possible.

For the above CMU results sequences are used for which the gender of the subject could be determined using accompanying video footage. Next it is asked whether gender can be estimate from the markers automatically (cf. [Livne et al. 2012]). A linear support vector machine is used to predict gender from body model parameters. First a gender-neutral body model is fitted to all subjects in the CAESAR dataset to obtain linear shape coefficients. Then the SVM is trained to predict known gender given the shape parameters. Then gender classification is evaluated on body shape parameters estimated by MoSh from the CMU dataset with the gender-neutral body model. For the 39 subjects with known gender it is correctly predicted 89.7% of the time; this is comparable to [Livne et al. 2012], which is not surprising since both methods rely on essentially the same kind of marker data.

Given the estimate of intrinsic shape, $\beta$, and the marker locations, $\tilde{M}$, now the pose 113 across a mocap sequence is optimized. The pose 113 for 39 subjects is computed across 722 different mocap sequences in the CMU dataset.

Figure 19:
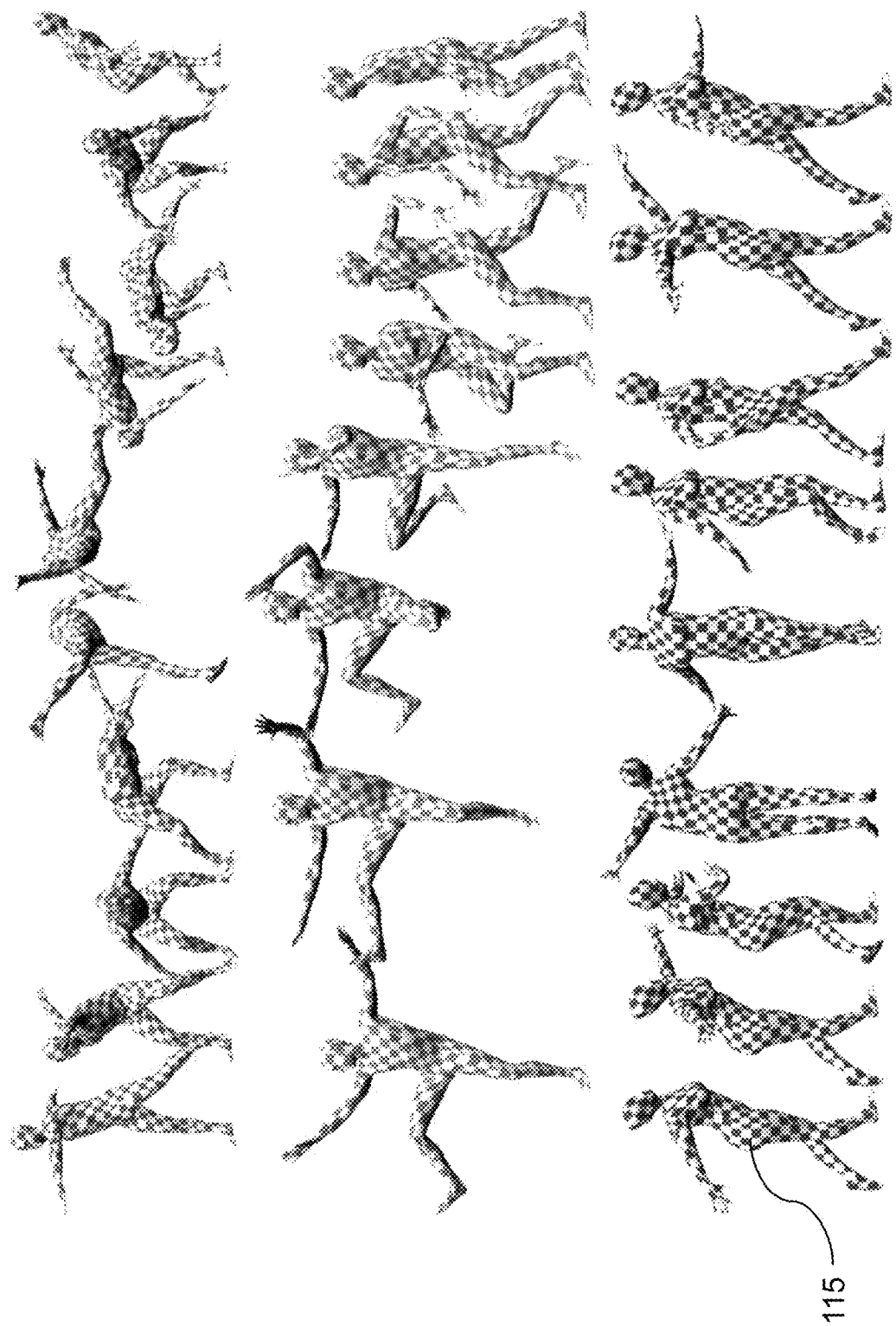
FIG. 19 shows CMU mocap.

FIG. 19 shows CMU mocap. Example meshes extracted from the CMU mocap dataset and representative frames from the animation. All shapes and poses are estimated automatically using only 47 markers 117. FIG. 19 shows some representative frames from some representative sequences in the CMU dataset. Even with 47 markers 117 some soft tissue deformation can be captured and the results shown here allow body shape deformation over time. The visual nuance of pose reconstruction is difficult to illustrate in a static image but is apparent in the accompanying video. Note that this is fully automatic.

The best way to evaluate accuracy of pose 113 and shape 111 together is in terms of held out marker error. For this 20 subjects and 73 mocap sequences are used acquired with the extended marker set. 67 markers are used for estimation and 22 to compute held-out error. This error is 3.4 cm and corresponds to the rightmost point on the right plot in FIG. 15 (right).

With a small marker set, noise in any one marker 117 can have an impact. In the shape estimation stage, the shape and marker placement are estimated from many poses 113, so variation in any individual marker 117 should not unduly harm shape or marker placement estimation. During pose estimation, velocity constancy helps reduce the effect of single marker noise. Future work should address methods to automatically detect and downweight missing markers or markers that have moved.

The body model was learned to represent both shape 111 and posedependent deformations from registered meshes of static subjects. Many other subtle body shape deformations were not explicitly learned by the model, including static muscle contraction, breathing, gravity, external forces, and dynamics. What is shown is that the space of body shapes 111 learned from different people captures variations in shape 111 that can approximate soft tissue motions. Note that the dynamics of soft tissue are not modeled. Only the effects of such motions are fitted that are apparent in the marker data.

Figure 20:
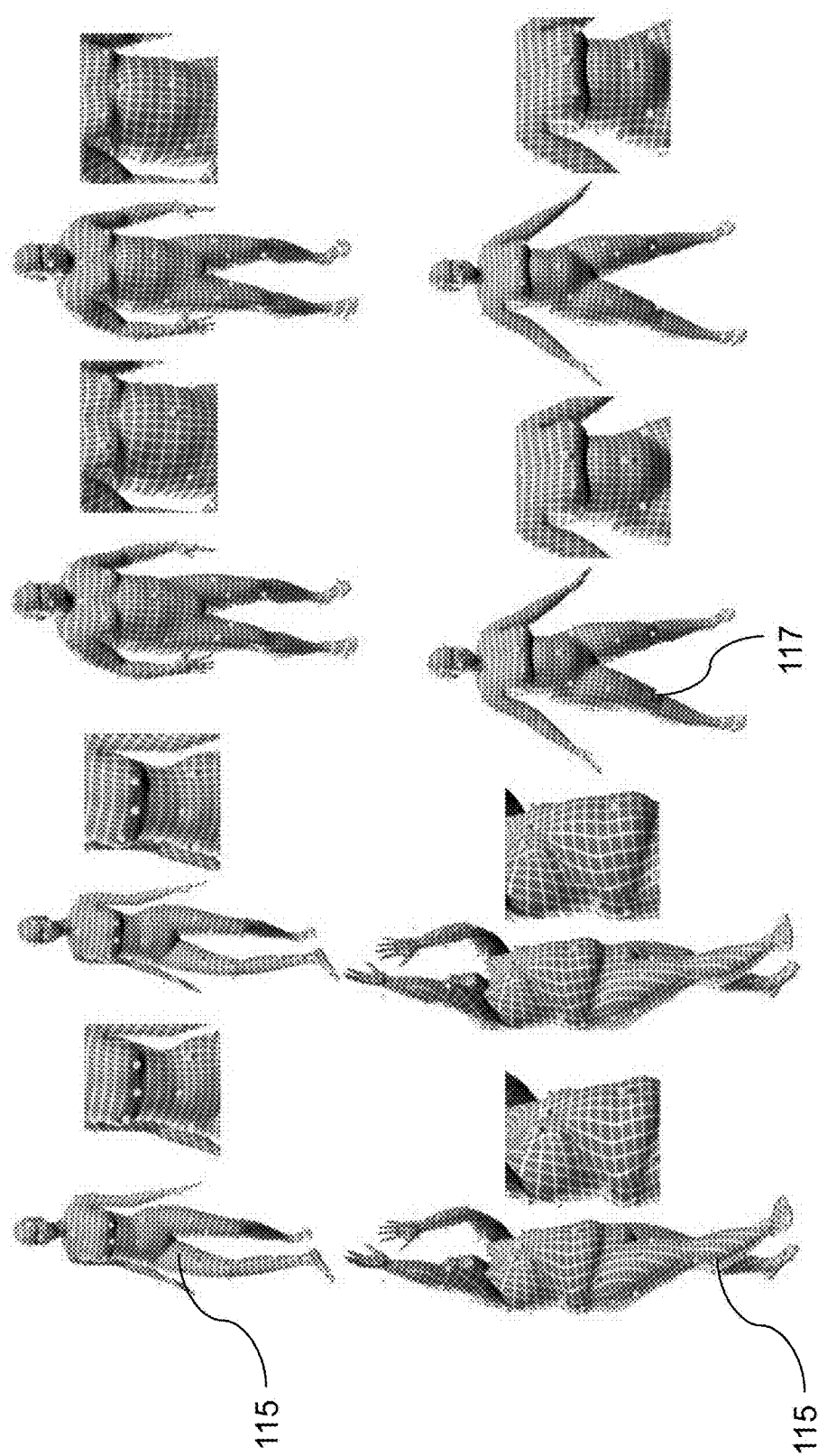
FIG. 20 shows motion of soft tissue.

FIG. 20 shows motion of soft tissue and examples from several sequences. Some representative samples are shown. In each pair, the left image is without modeling dynamics (body shape 111 fixed) and the right with dynamics (body shape varying). Each image shows the full body and a detail region. Light balls correspond to the mocap markers 117. Dark balls correspond to the simulated marker locations. Allowing body shape 111 to change over time better captures soft tissue deformations. Note that, with dynamics, the predicted markers much more closely match the observed markers.

The estimated body shape 111 is shown with a single body shape, $\beta$, per subject (left image in each pair) and the results allowing deviations, $\beta_t$, from this shape 111 (right image in each pair). Note the markers on the chest and belly. Dark are the simulated markers predicted by the model and light are the observed markers. With changing body shape 111, the markers 117 undergoing soft-tissue deformation are more accurately fitted. This is not surprising, but what is important is that the shape 111 remains "natural" and continues to look like the person.

Numerically it is seen that the mean observed marker error go down from 0.79 cm to 0.62 cm with dynamics. Again this is not surprising since it is allowed for the shape 111 to deform to fit these markers 117. Held out marker error is also tested; these are markers 117 that were not used to estimate shape 111. Here too the mean error is seen to go from 3.41 cm to 3.39 cm. This is not a significant improvement, but rather a validation that fitting the soft-tissue motion does not hurt held-out marker error. This confirms the subjective impression that the body shape 111 does not deform unnaturally and the non-rigid motions, away from the tracked markers, reflect realistic body deformations. While, of course, fine ripples cannot be captured with a sparse set of markers, it is surprising how much realistic deformation MoSh can estimate.

In the video one sees the observed markers "swimming" around relative to the estimated shape 111 when dynamics are not modeled. There 47 markers are also compared with the 67-marker set and find that the extra markers placed on the soft tissue are important.

The soft tissue deformations correspond to directions in the space of human body shapes 111. The amount of deformation along these directions can be varied to either attenuate or amplify the effect. Specifically the 3D motion is magnified by multiplying $\beta_t$, a user specified constant to exaggerate the soft tissue deformations.

This is difficult to show in print but the video shows examples of the same sequence with different levels of exaggeration. It is found that the deformations could be magnified by a factor of 1.5 or 2 while retaining something like natural motion. Pushing the exaggeration by a factor of 4 sometimes produce interesting effects and, other times, unnatural body shapes 111.

This tool could be useful to animators to produce reference material since it highlights how soft tissue deforms. It could also be used to create new effects that exaggerate human actions but in a way that is based on physically realistic deformations.

FIG. 21 shows retargeting soft-tissue motions. Top row: Body part segmentation for human and stylized characters. Middle row: retargeting pose and soft-tissue motion of an actor (left) to a stylized female character (middle), with heat maps (right) illustrating the percentage of soft-tissue deformation; dark means zero and light means ≥20 percent deformation. Bottom row: retargeting to another stylized character. The soft-tissue motions can be visualized.

An important use of skeletal mocap data is the retargeting of motion to a new character; the same can be done with MoSh. Consider the stylized characters in FIG. 21 that were downloaded from the Internet. For each character, the template is deformed towards the character using regularized registration, initialized by hand-clicked correspondences. To model shape deformations from this character mesh, the PCA model of body shape 111 is simply re-centered by replacing the original mean shape, µ, with the character's template deformations. The soft tissue deformation coefficients, $β_t$, are then simply applied to this new mean shape. The estimated translation, $γ_t$, and MoSh part rotations, $θ_t$, are also directly applied to the parts of the new character along with the learned non-rigid pose-dependent shape deformations. This produces plausible animations. Note that, to get realistic soft-tissue transfer, human actors with body shapes are used that resemble the stylized character; see FIG. 21. Of course, these deformations can also be exaggerated. MoSh addresses a key criticism of existing motion capture methods. By estimating a changing body shape 111 over time from sparse markers, MoSh captures detailed non-rigid motions of the body 115 that produce lifelike animations. MoSh is completely compatible with existing industry-standard mocap systems. It can be used alone or in conjunction with traditional skeletal mocap since no information is lost and MoSh can use exactly the same markers as current systems. The hope is that MoSh breathes new life into old mocap datasets and provides an easily adopted tool that extends the value of existing investments in marker-based mocap.

There are several current limitations that present interesting directions for future work. For example, it is needed to roughly know the marker set and it is also assumed the markers are in correspondence. It can be corrected for some mislabeled markers but still a largely labeled dataset is assumed. Establishing correspondence and cleaning markers sets is a time consuming part of current mocap practices. It would be interesting to leverage the body model to try to solve these problems automatically. For example, the simulated mark could also be used to detect when a marker 117 is missing or has moved. If a marker 117 moves between sessions its location could then be updated on the fly. It could also be estimated the noise in each marker 117 independently and take this into account during pose and shape estimation. The estimated body pose 113 could also be used to create a virtual marker sequence that could replace the original. This would provide a principled way of fixing occlusions. Simulating a different set might be useful for methods that extract skeletal data from markers.

The quality of MoSh output is very dependent on the quality of the body model that is used. If the model cannot represent a pose 113 realistically, then the output of MoSh will have artifacts. This is observed for a few poses, for example, both arms pointed forward, elbows straight and palms together. This suggests the pose training set should be augmented with new poses.

An interesting direction for future work would be to use other types of body models. For example, it should be possible to replace the model with one that uses linear blend skinning and corrective blend shapes.

The method for evaluating new marker sets could be used to construct sets to capture specific types of non-rigid deformations such as breathing. If the 3D mesh sequences are given the analysis could be extended to select marker sets directly relevant for capturing soft tissue motion. It is not evaluated which poses 113 are most effective for estimating body shape 111; 12 are simply chosen at random. Jointly optimizing the marker set and the poses 113 could make a mocap system a more effective "body scanner;" the body scanning protocol would involve attaching the markers and having the subject assume the prescribed poses.

The soft-tissue motions are approximations based on sparse markers but result in dense deformations. Since it is easy to acquire the data, it would be interesting to use these to train a more physical model of how soft tissue moves. That is, possibly MoSh could be leveraged to learn a more sophisticated body shape model with dynamics. This could allow generalization of soft-tissue motions to new body shapes 111 and movements. Improved estimation could also be achieved by coupling the marker-based analysis with video or range data.

An important application of MoSh is virtual production: enabling directors to see realistically what an entire animated character would look like in a scene, while on-set, has the potential to be a valuable asset for creative control. But it should be clear to someone practiced in the art that although it is applied to the body 115 as a whole, this method can be applied with specific focus to particular parts (faces, hands and feet) or with attention to clothing.

Marker-based motion capture (mocap) is widely criticized as producing lifeless animations. It is argued that important information about body surface motion is present in standard marker sets but is lost in extracting a skeleton. It is demonstrated a new approach called MoSh (Motion and Shape capture), that automatically extracts this detail from mocap data. MoSh estimates body shape 111 and pose 113 together using sparse marker data by exploiting a parametric model of the human body 115. In contrast to previous work, MoSh solves for the marker locations relative to the body 115 and estimates accurate body shape 111 directly from the markers 117 without the use of 3D scans; this effectively turns a mocap system into an approximate body scanner. MoSh is able to capture soft tissue motions directly from markers 117 by allowing body shape 111 to vary over time. It is evaluated the effect of different marker sets on pose and shape accuracy and propose a new sparse marker set for capturing soft-tissue motion. It is illustrated MoSh by recovering body shape 111, pose 113, and soft-tissue motion from archival mocap data and using this to produce animations with subtlety and realism. It is also shown soft-tissue motion retargeting to new characters and show how to magnify the 3D deformations of soft tissue to create animations with appealing exaggerations.

The scope of the invention is given by the claims and is restricted neither by the above description nor by the accompanying figures. All features discussed with respect to particular embodiments or figures can be combined in various ways in order to simultaneously realize their advantageous effects.

What is claimed is:

1. A method for providing a three-dimensional body model which may be applied for an animation, based on a moving body, wherein the method comprises:
   providing a parametric three-dimensional body model, which allows shape and pose variations;
   applying a set of body markers;
   optimizing the set of body markers by generating an additional set of body markers and applying the additional set of body markers to the three dimensional body model for providing 3D coordinate marker signals for capturing shape and pose of the body and dynamics of soft tissue;
   automatically providing an animation by processing the 3D coordinate marker signals in order to provide a personalized three-dimensional body model, based on estimated shape and an estimated pose of the body by means of predicted marker locations; and the three-dimensional body model is trained by means of a set of scans in a plurality of shapes and poses in order to represent shape and pose-dependent deformations.

2. The method according to claim 1, wherein the marker set is sparse.

3. The method according to claim 1, wherein a handful of markers is arranged on any body part.

4. The method according to claim 1, wherein the number of body markers is below or equal to 47 or 67.

5. The method according to claim 1, wherein the pose of the body is assumed to vary smoothly over time.

6. The method according to claim 1, wherein the body shape of the subject does not change over time.

7. The method according to claim 1, wherein the body shape of the subject changes over time.

8. The method according to claim 6, wherein the changing body shape is constrained to be close to a fixed body shape representing a person's identity.

9. The method according to claim 1, wherein the method is applied for providing an animation of a character without converting motion capture data to a rigged model of the character.

10. The method according to claim 1, wherein the three-dimensional body model is directly used for an animation of a character.

11. The method according to claim 1, wherein the three-dimensional body model is used as reference for retargeting the data to other animated characters.

12. The method according to claim 1, wherein the three-dimensional body model considers dynamics of complex surface deformation, in particular of soft tissue, like fat and muscle.

13. The method according to claim 12, wherein the dynamics of complex surface deformation is transferred to a further three-dimensional body model.

14. A method according to claim 13, wherein the dynamics of complex surface deformation is exaggerated or attenuated, when transferring it to the further three-dimensional body model.

15. The method according to claim 1, wherein the method may be executed on archival motion capture sequences.

16. The method according to claim 1, wherein the additional set of body markers is positioned on soft tissue.

17. The method according to claim 1, wherein the additional set of body markers is selected from a generated superset of additional maker sets.

18. The method according to 17, wherein the additional set of body markers is selected to optimize a given objective function.

19. The method according to 17, wherein a greedy search method is used for selecting the additional set of body markers.

20. The method according to claim 1, wherein the method is used in a motion capture system.

21. The method according to claim 1, wherein body is a human or animal body.

22. Non-transitory computer readable medium containing computer-readable instructions stored therein for causing a computer processor to perform the steps of the method according to claim 1.

23. An apparatus for providing a three-dimensional body model which may be applied for an animation, based on a moving body, comprising:
    a model storage which is adapted for providing a parametric three-dimensional body model, which allows shape and pose variations;
    a position detector which is adapted for applying a set of body markers to the three dimensional body model;
    an optimizer, which is adapted for optimizing the set of body markers by generating an additional set of body markers and applying the additional set of body markers to the three dimensional body model for providing 3D coordinate marker signals for capturing shape and pose of the body and dynamics of soft tissue;
    a processor for automatically processing the 3D coordinate marker signals in order to provide a personalized three-dimensional body model, based on estimated shape and an estimated pose of the body by means of predicted marker locations; and training the three-dimensional body by means of a set of scans in a plurality of shapes and poses in order to represent shape and pose-dependent deformations, and in particular, wherein the training is executed separately for men and women.

* * * * *